(12) United States Patent
Ameye et al.

(10) Patent No.: US 11,865,922 B2
(45) Date of Patent: Jan. 9, 2024

(54) DRIVE ARRANGEMENT FOR A VEHICLE

(71) Applicant: Protean Electric Limited, Farnham (GB)

(72) Inventors: Jonathan Bernard Ameye, Graz (AT); Cyril Aime Gerland, Shanghai (CN); Nicolas Jean Albert Allain, Munich (DE)

(73) Assignee: Protean Electric Limited, Farnham (GB)

( * ) Notice: Subject to any disclaimer, the term of this patent is extended or adjusted under 35 U.S.C. 154(b) by 108 days.

(21) Appl. No.: 17/599,846

(22) PCT Filed: Mar. 30, 2020

(86) PCT No.: PCT/IB2020/053004
§ 371 (c)(1),
(2) Date: Sep. 29, 2021

(87) PCT Pub. No.: WO2020/201984
PCT Pub. Date: Oct. 8, 2020

(65) Prior Publication Data
US 2022/0185096 A1 Jun. 16, 2022

(30) Foreign Application Priority Data

Mar. 29, 2019 (GB) .................................. 1904386

(51) Int. Cl.
*B60K 7/00* (2006.01)
*B60K 17/04* (2006.01)
(Continued)

(52) U.S. Cl.
CPC .......... *B60K 7/0007* (2013.01); *B60K 17/046* (2013.01); *B60K 17/30* (2013.01);
(Continued)

(58) Field of Classification Search
CPC ................ B60K 7/0007; B60K 17/046; B60K 2007/0038; B62D 5/0418
See application file for complete search history.

(56) References Cited

U.S. PATENT DOCUMENTS

| 5,450,320 | A  | * | 9/1995 | Tsubaki | ................... | B62D 1/28 318/587 |
| 6,371,779 | B2 | * | 4/2002 | Matsumoto | ........... | B60R 16/027 439/164 |

(Continued)

FOREIGN PATENT DOCUMENTS

| CN | 106696682 | 5/2017 |
| DE | 102007035010 | 1/2009 |

(Continued)

OTHER PUBLICATIONS

International Search Report and Written Opinion; PCT/IB2020/053004; dated Jun. 17, 2020; entire document.

*Primary Examiner* — Erez Gurari
(74) *Attorney, Agent, or Firm* — Allen, Dyer, Doppelt & Gilchrist, P.A.

(57) ABSTRACT

A drive arrangement for a vehicle, the drive arrangement comprising a rotatable interface arranged to be mounted to the vehicle, wherein the rotatable interface is rotatably coupled to a mounting arm to allow continuous rotation of the mounting arm in a clockwise and anti clockwise direction that is substantially perpendicular to the longitudinal and transverse axis of the vehicle; and a first electric motor having a stator and a rotor, wherein the stator is coupled to the mounting arm to allow the axis of the rotor to be substantially perpendicular to the rotational axis of the rotatable interface, wherein the rotor is arranged to be coupled to a wheel of the vehicle to allow the electric motor to provide drive torque to the wheel.

25 Claims, 21 Drawing Sheets

(51) Int. Cl.
  *B60K 17/30* (2006.01)
  *B60K 17/34* (2006.01)
  *B62D 5/04* (2006.01)
  *B60K 11/02* (2006.01)
  *B60K 1/00* (2006.01)

(52) U.S. Cl.
  CPC ......... *B60K 17/358* (2013.01); *B62D 5/0418* (2013.01); *B60K 11/02* (2013.01); *B60K 2001/006* (2013.01); *B60K 2007/0038* (2013.01)

(56) References Cited

U.S. PATENT DOCUMENTS

| | | | | |
|---|---|---|---|---|
| 7,418,328 B2* | 8/2008 | Romig | ............ | A01D 34/008 180/413 |
| 7,617,890 B2* | 11/2009 | Romig | ............ | B62D 7/023 56/6 |
| 7,905,304 B2* | 3/2011 | Adachi | ............ | B66F 9/063 180/12 |
| 10,293,847 B2* | 5/2019 | Calmettes | ............ | B62D 5/0418 |
| 10,710,404 B2* | 7/2020 | Wiley | ............ | B60B 33/0078 |
| 11,498,379 B2* | 11/2022 | Wuebbolt-Gorbatenko | ............ | B62D 7/18 |
| 2010/0206647 A1* | 8/2010 | Ishii | ............ | B62D 9/00 180/6.24 |
| 2015/0083508 A1* | 3/2015 | Bluethmann | ............ | B62D 5/0418 180/204 |
| 2020/0276877 A1* | 9/2020 | Gao | ............ | B62D 7/1581 |
| 2021/0023934 A1* | 1/2021 | Gillett | ............ | B62K 21/12 |
| 2021/0101479 A1* | 4/2021 | Gaither | ............ | B60K 17/346 |
| 2022/0144030 A1* | 5/2022 | Ameye | ............ | B60G 13/14 |
| 2022/0185096 A1* | 6/2022 | Ameye | ............ | B62D 5/0418 |

FOREIGN PATENT DOCUMENTS

| | | |
|---|---|---|
| EP | 0595302 | 5/1994 |
| JP | H03178832 | 8/1991 |

* cited by examiner

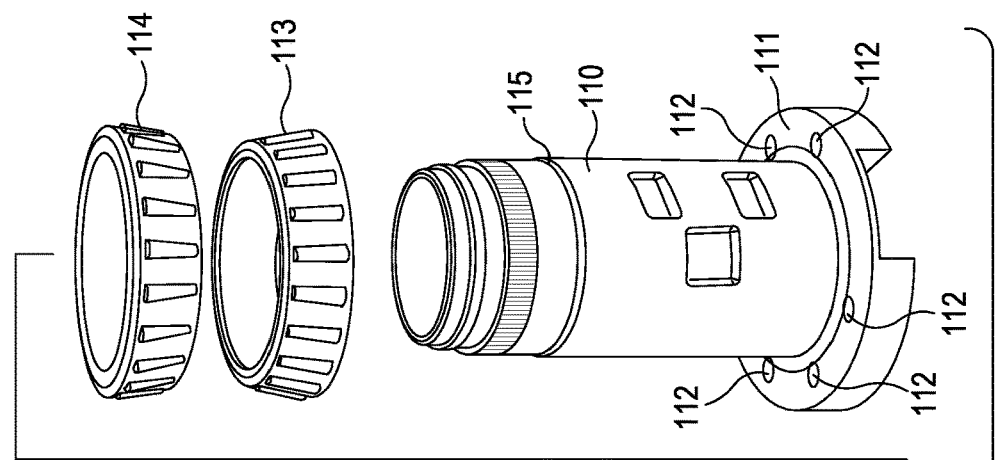
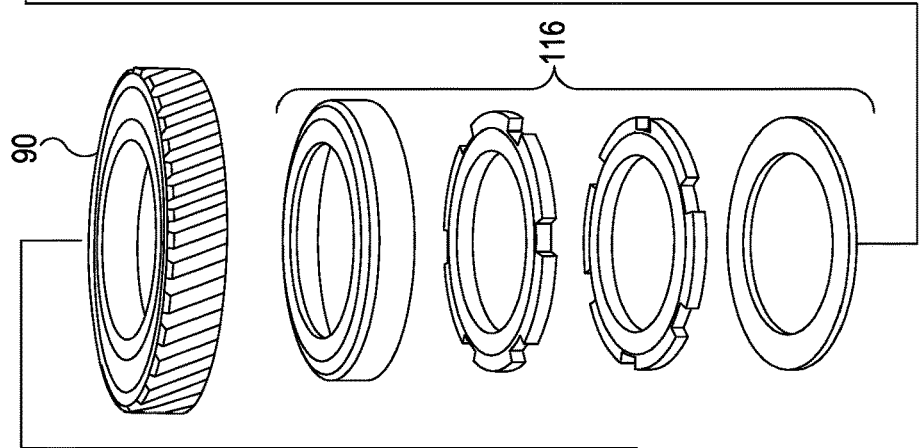
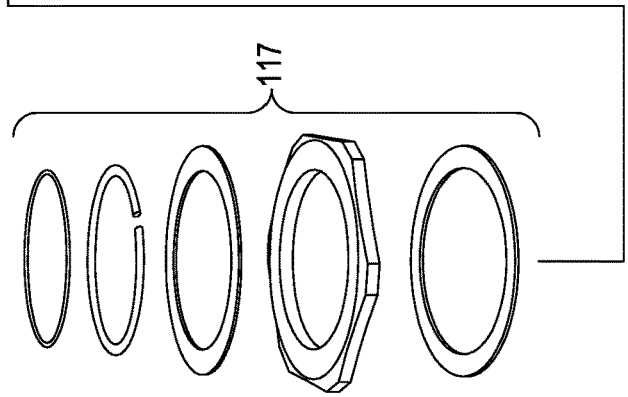
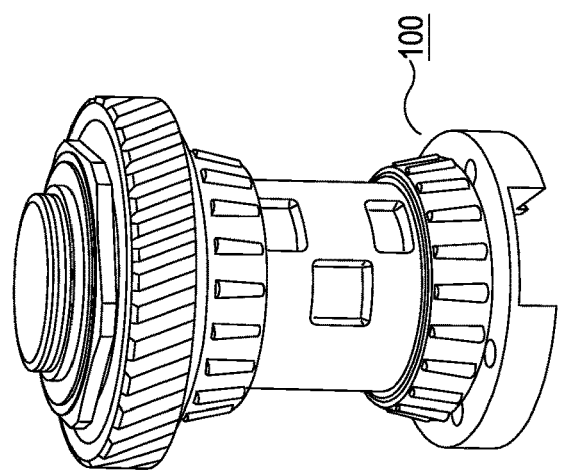
Fig. 11b
Fig. 11A

DRIVE ARRANGEMENT FOR A VEHICLE

The present invention relates to a drive arrangement for a vehicle, in particular a drive arrangement that provides a high degree of vehicle maneuverability.

Interest in driverless vehicles has been growing rapidly over the last few years, where it is anticipated that the use of driverless vehicles will have a dramatic impact on the way people travel and how goods are delivered.

Additionally, with new drive systems being designed that compliment driverless vehicle technology, for example in-wheel electric motors, the design constraints associated with autonomous transport are beginning to diverge from conventional vehicles. For example, operating features such as steering wheels and cockpit can be removed, where a greater emphasis will be associated with increased space with a need for improved maneuverability, safety and driving dynamics within an urban area.

In accordance with an aspect of the present invention there is provided a drive arrangement according to the accompanying claims.

The present invention has the advantage of providing a drive arrangement, which is arranged to generate a drive torque for a vehicle, which allows the drive arrangement to have a steering angle that can continuously rotate through 360 degrees for improved maneuverability of the vehicle. Additionally, the rotatable interface of the drive arrangement is configured to avoid stress being applied to mechanical, electrical, hydraulic or pneumatic interfaces incorporated within the rotatable interface, thereby allowing the drive arrangement to be provided with external resources for driving an electric motor while also providing resources to a braking and suspension system without imposing any physical constraint when providing these resources.

The present invention will now be described, by way of example, with reference to the accompanying drawings, in which:

FIG. 11 illustrates a mechanical interface according to an embodiment of the present invention;

The embodiment of the invention described is for a rotating drive arrangement incorporating an in-wheel electric motor, wherein the drive arrangement is arranged to provide both drive torque for a vehicle, via the in-wheel electric motor, and controlled steering of a wheel attached to the in-wheel electric motor.

Figure 1:
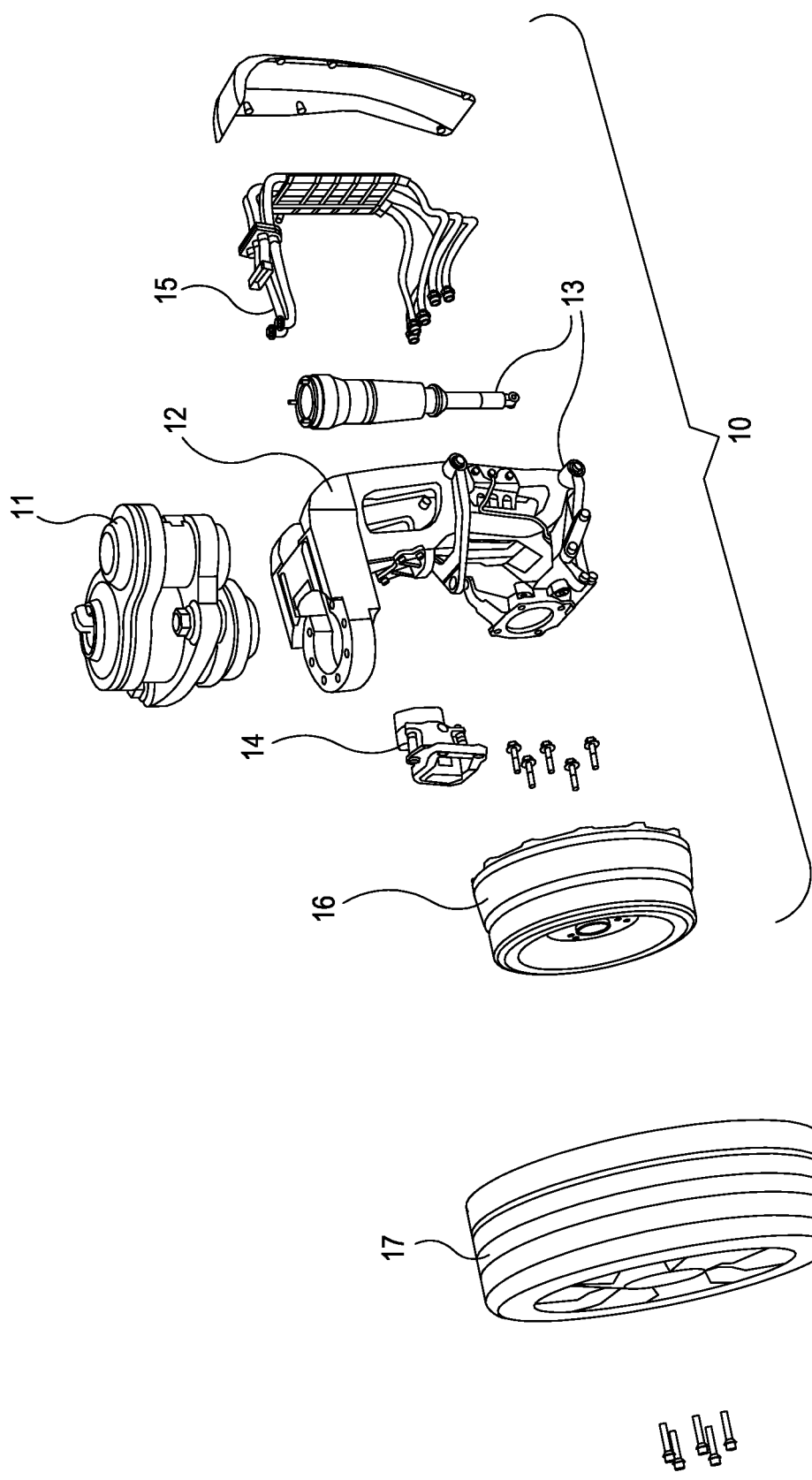
FIG. 1 illustrates an exploded view, from a first perspective, of a drive arrangement according to an embodiment of the present invention.
Figure 2:
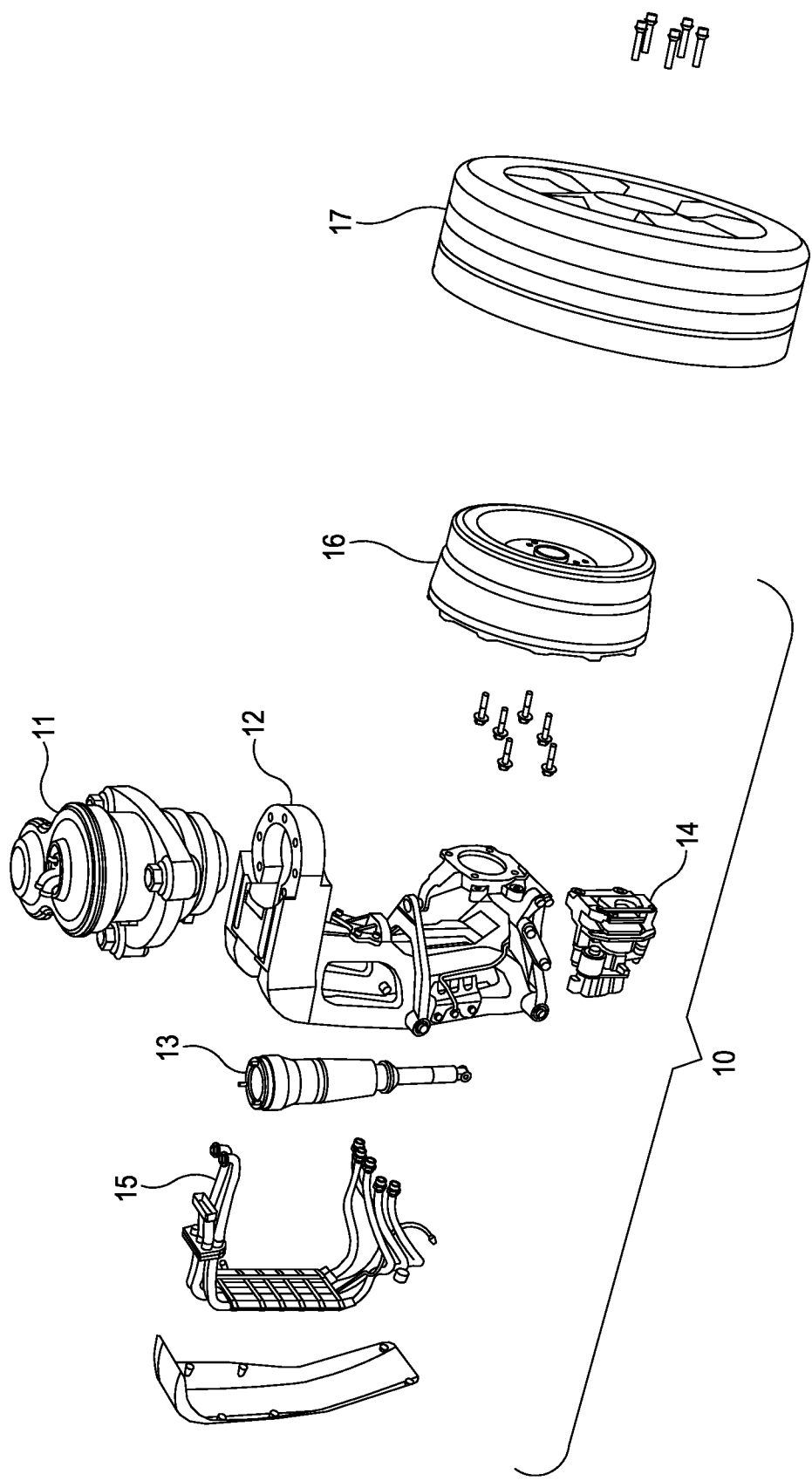
FIG. 2 illustrates an exploded view, from a second perspective, of a drive arrangement according to an embodiment of the present invention.

FIG. 1 and FIG. 2 illustrate an exploded view of a drive arrangement 10 according to an embodiment of the present invention, wherein FIG. 2 shows an exploded view of the drive arrangement 10 as FIG. 1 from an opposite side.

The drive arrangement 10 includes a rotatable interface 11, a mounting arm 12, a suspension system 13, a brake system 14, cabling 15 to provide resources from the vehicle to drive arrangement components, as described in detail below, and an in-wheel electric motor 16.

The in-wheel electric motor 16 is arranged to provide a drive torque for a vehicle via a wheel/tyre 17 mounted to the in-wheel electric motor 16. The rotatable interface 11 is arranged to allow unlimited/continuous rotation without causing stress to any mechanical or other resources (e.g. electrical, hydraulic and pneumatic resources) that are arranged to be transmitted through the rotatable interface 11, wherein the rotatable interface 11 is configured to control the steering angle of the wheel/tyre 17 coupled to the in-wheel electric motor 16 while allowing electrical and fluid resources to be provided to the in-wheel electric motor 16, the suspension system 13 and the brake system 14, which form part of the drive arrangement.

Figure 3:
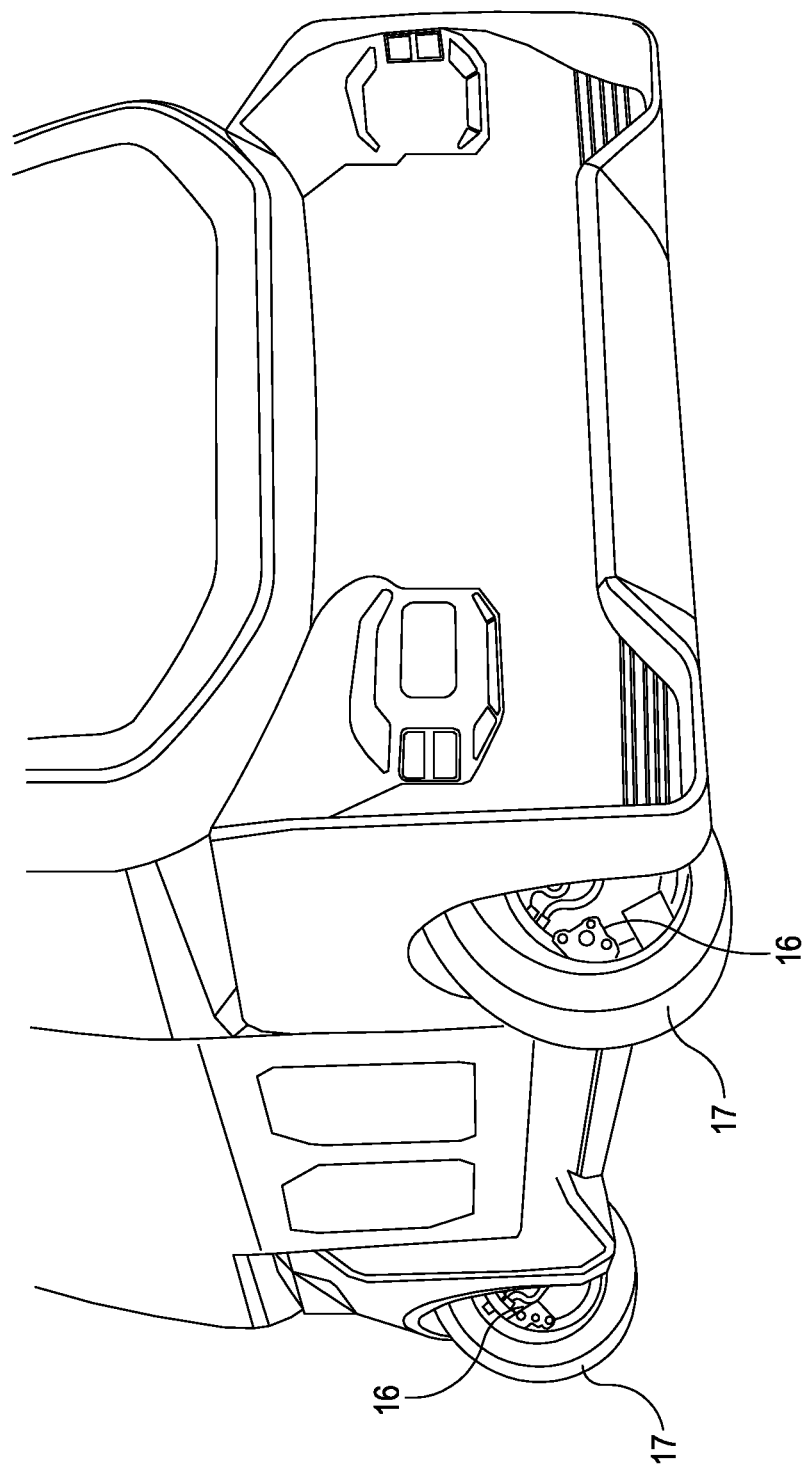
FIG. 3 illustrates partial perspective of a vehicle incorporating a drive arrangement according to an embodiment of the present invention.

FIG. 3 illustrates a partial perspective view of a vehicle having a drive arrangement, according to an embodiment of the present invention, mounted at each corner of the vehicle to provide independent four wheel drive for the vehicle. For the purpose of FIG. 3, the wheel/tyre 17 and in-wheel electric motor 16 for two of the drive arrangements can be seen. However, other drive configurations may be adopted, for example two drive arrangements may be mounted at either the front or rear corners of the vehicle to provide a front or rear wheel drive vehicle.

Figure 4:
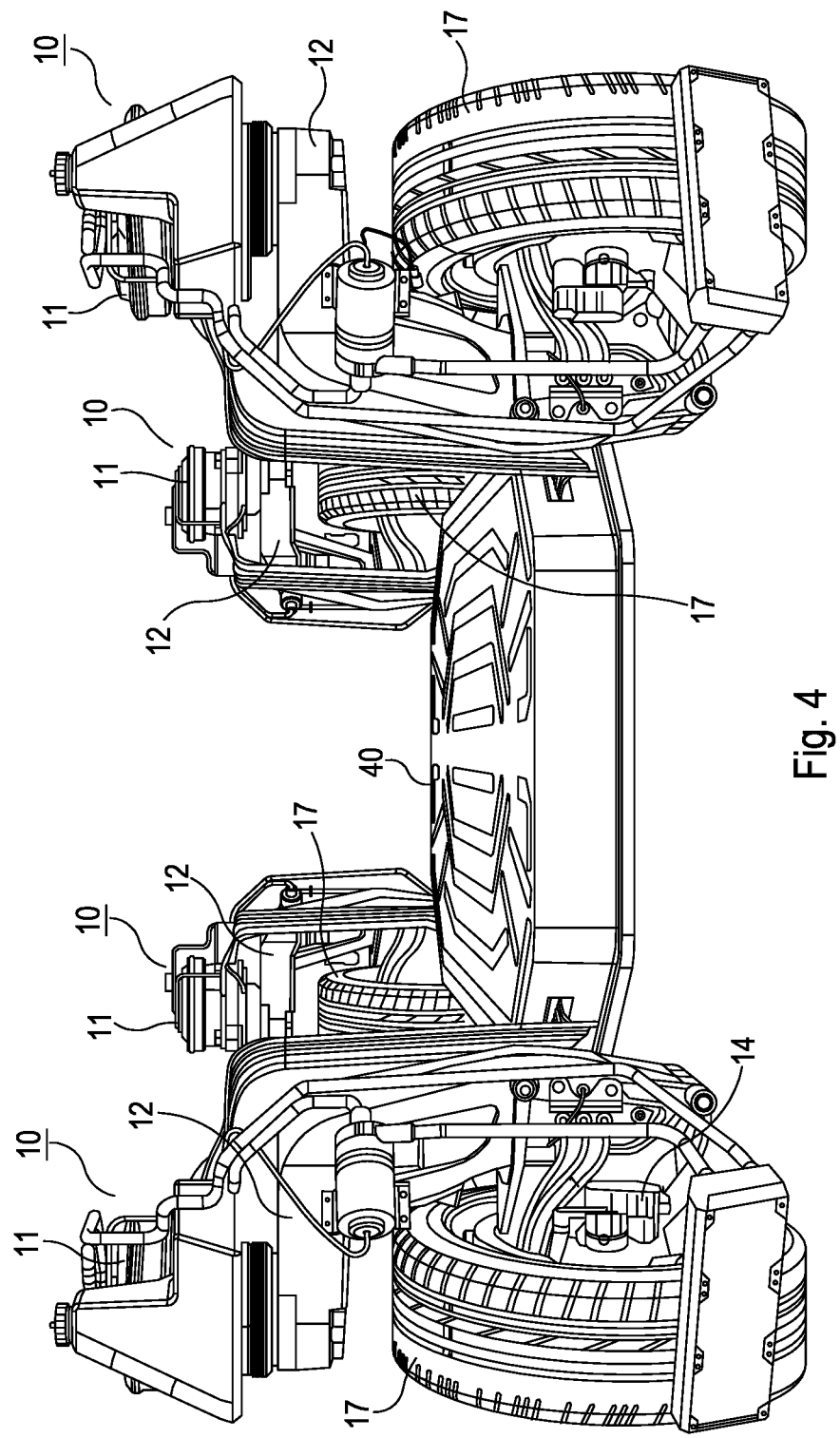
FIG. 4 illustrates a four drive arrangement configuration according to an embodiment of the present invention.

FIG. 4 illustrates a further view of the vehicle shown in FIG. 3, where for ease of illustration the vehicle body work has been removed to show four corner drive arrangements 10 coupled to a plug and play unit 40, which is preferably configured to include a battery for providing a current to the respective in-wheel electric motors 16 for each drive arrangement 10. Preferably the plug and play unit 40 also includes a control unit for controlling the operation of the respective drive arrangements 10.

Embodiments of the various drive arrangement components will now be described.

Figure 5:
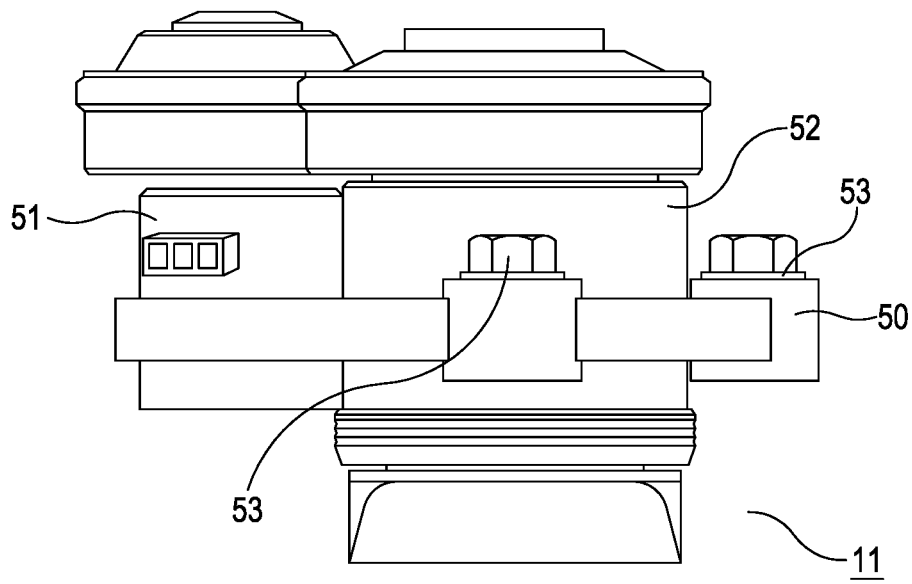
FIG. 5 illustrates a rotatable interface according to an embodiment of the present invention.
Figure 6:
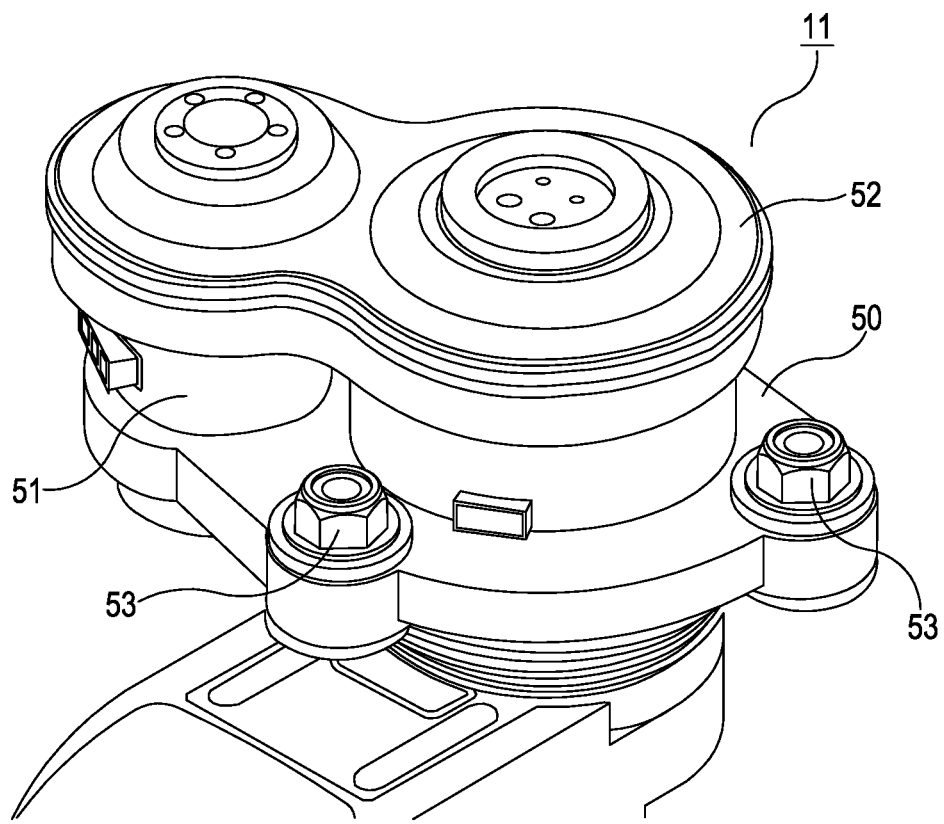
FIG. 6 illustrates a rotatable interface according to an embodiment of the present invention.

FIG. 5 and FIG. 6 illustrate different perspective views of the rotatable interface 11, where the rotatable interface 11 includes a mounting plate 50, a steering electric motor unit 51 and a rotating interface unit 52.

Figure 7:
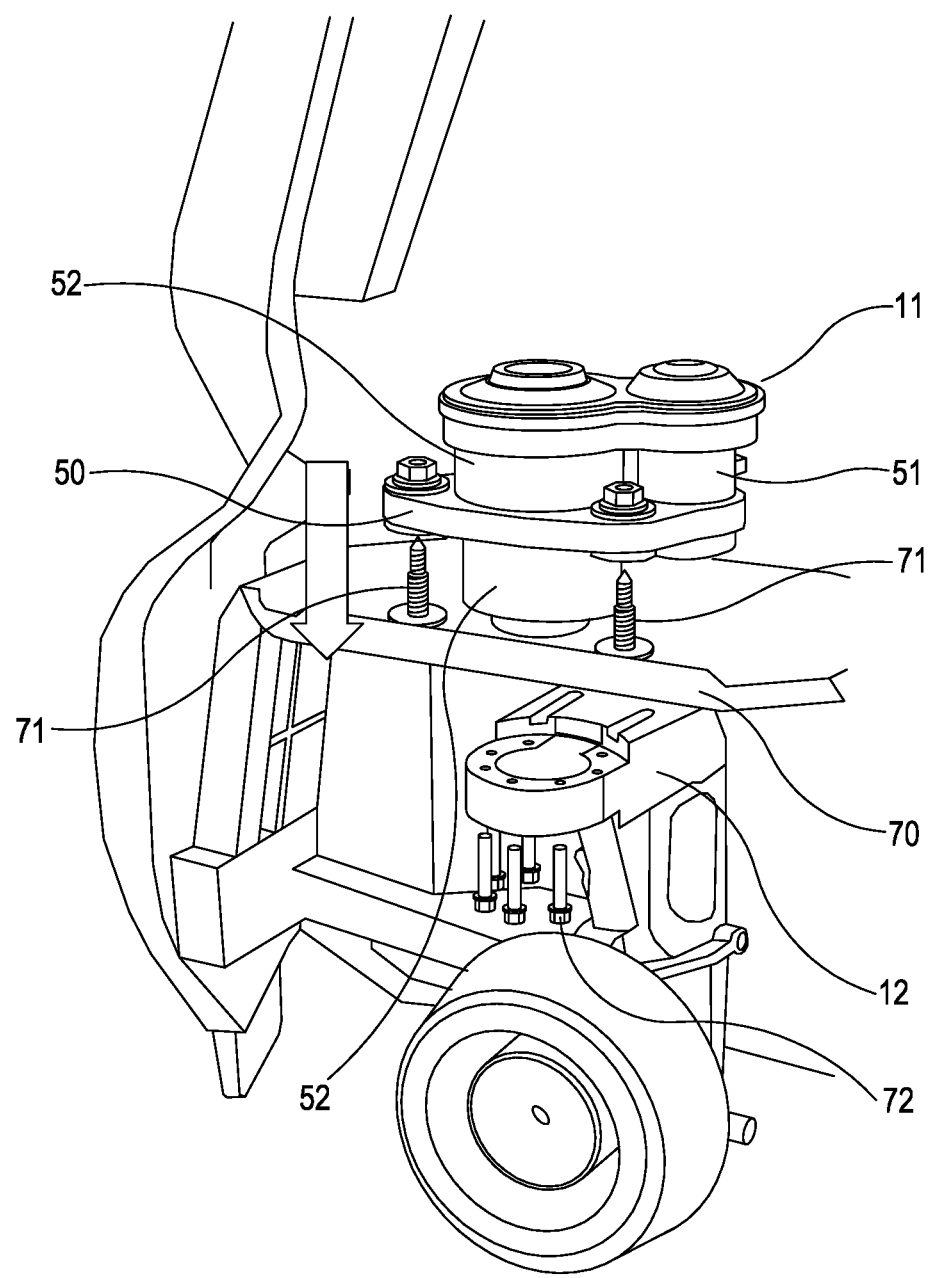
FIG. 7 illustrates a vehicle incorporating a drive arrangement according to an embodiment of the present invention.

The mounting plate has three mounting points 53 where, as illustrated in FIG. 7, the mounting plate 50 is arranged to be mounted to a chassis 70 of a vehicle, for example, on a corner section of the chassis 70 via the use of bolts 71. Consequently, the orientation of the mounting plate is fixed with respect to the vehicle chassis. The rotatable interface 11 is rotatably coupled to the mounting arm 12 to allow continuous rotation of the mounting arm 12 in a clockwise and anti clockwise direction that is substantially perpendicular to the longitudinal and transverse axis of the vehicle, for example the camber angle (rim axis) may typically be between 0 and 3 degrees, meaning that it could positioned at 90 degrees+/−3 degrees. The rotation axis itself (caster angle), may vary between 0+/−5 degrees compared to the Z axis of the vehicle (i.e. the vertical axis).

As described below, the in-wheel electric motor 16 includes a stator and a rotor, wherein the stator is coupled to the mounting arm 12 to allow the axis of the rotor to be substantially perpendicular to the rotational axis of the rotatable interface 11, wherein the rotor is arranged to be coupled to the wheel of the vehicle to allow the electric motor 16 to provide drive torque to the wheel As illustrated in FIG. 5 and FIG. 6, the steering electric motor unit 51 is mounted to the mounting plate 50, where the steering electric motor unit 51 includes an electric motor having a rotor attached to a gear arrangement, otherwise known as a cog wheel configuration 80. Additionally, as also illustrated in FIG. 5, the steering electric motor unit 51 includes electrical connectors for providing power and control signals to the steering electric motor unit 51, where current is provided to the electric motor within the steering electric motor unit 51 for rotating the rotor and control signals are sent to the steering electric motor unit 51 to control the rotational position of the rotor to allow accurate steering of the mounting arm. Preferably, the steering electric motor unit 51 also provides rotor position information to the vehicle to ensure the vehicle is able to check the orientation of the mounting arm, where for example the relative rotor position is determined by a sensor arranged to determine the rotational position of the rotatable interface with respect to the vehicle.

Figure 8B:
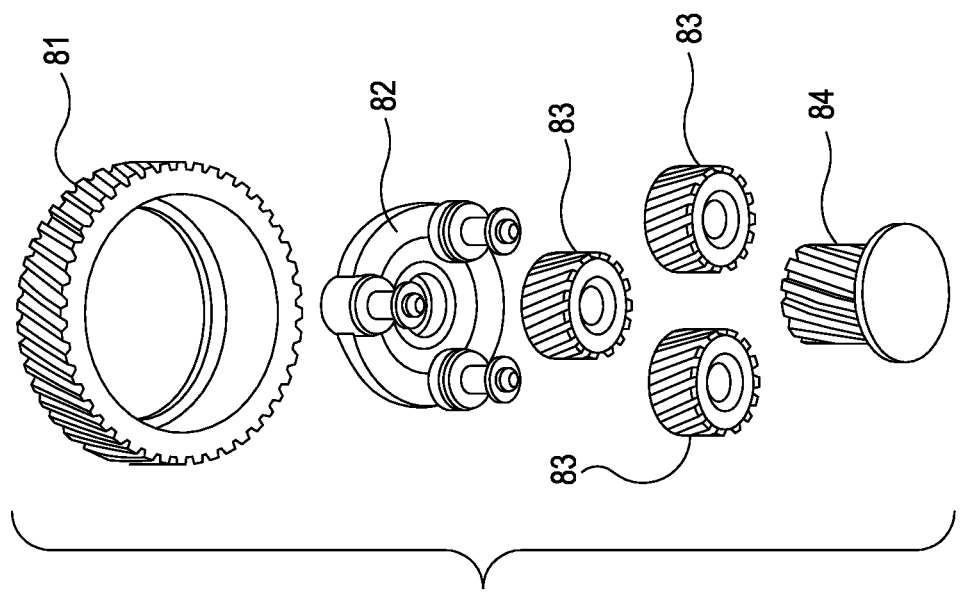
FIG. 8 illustrates a cog wheel used within a rotatable interface according to an embodiment of the present invention.
Figure 8A:
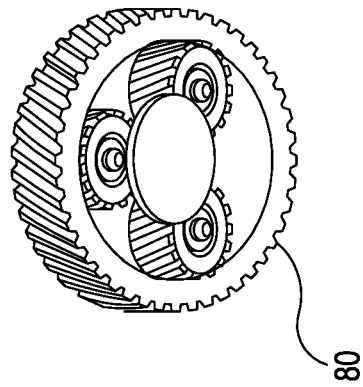

With regard to the cog wheel configuration, an illustration of a preferred embodiment of the cog wheel configuration 80 is illustrated in FIG. 8, where an exploded view of the cog wheel configuration is illustrated in FIG. 8a. As shown in FIG. 8a, the cog wheel configuration includes a planetarium bell 81, an inter gear wheel 82, an inter gear 83 and a central gear wheel 84, where the central gear wheel 84 is coupled to the electric motor of the steering electric motor unit 51, which is arranged to rotate the inter gear 83, the inter gear wheel 82 and planetarium bell 81.

Figure 9:
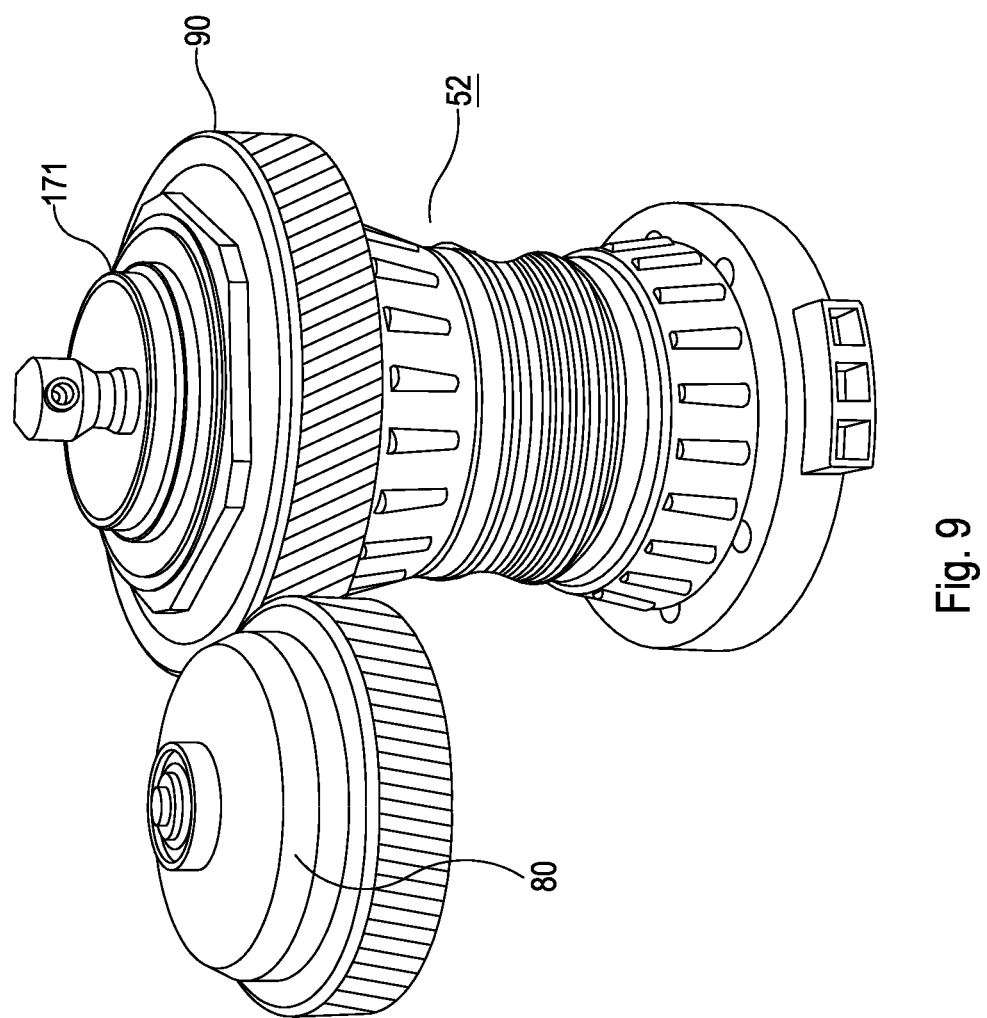
FIG. 9 illustrates a rotatable interface unit according to an embodiment of the present invention.

As illustrated in FIG. 9, the gear arrangement/cog wheel configuration 80 of the steering electric motor unit 51 is arranged to engage with a cog wheel 90 that forms part on the rotating interface unit 52 to allow the steering electric motor unit 51 to rotate the rotating interface unit 52, where the bottom section of the rotating interface unit 52 is attached to an upper section of the mounting arm 12. To aid illustration of the rotating interface unit 52, the housing surrounding the rotating interface unit shown in FIG. 5 and FIG. 6 has been removed from the rotating interface unit shown in FIG. 9. As illustrated in FIG. 7, for the purposes of the present embodiment, the rotating interface unit 52 is attached to the mounting arm 12 via seven bolts 72.

As would be appreciated by a person skilled in the art, the gearing of the gear arrangement 80 can be selected to balance the needs between torque required to rotate the mounting arm 12 and in-wheel electric motor 16 and the rotational speed at which the mounting arm 12 and in-wheel electric motor 16 can be rotated.

By using the gear arrangement 80 of the steering electric motor unit 51 in conjunction with the cog wheel 90 of the rotating interface unit 52, this allows the steering electric motor unit 51 to be rotationally offset with respect to the rotating interface unit 52, thereby allowing the space around the rotational axis of the rotating interface unit 52 to be used for providing resources from the vehicle to components of the drive arrangement, as described below.

Figure 10:
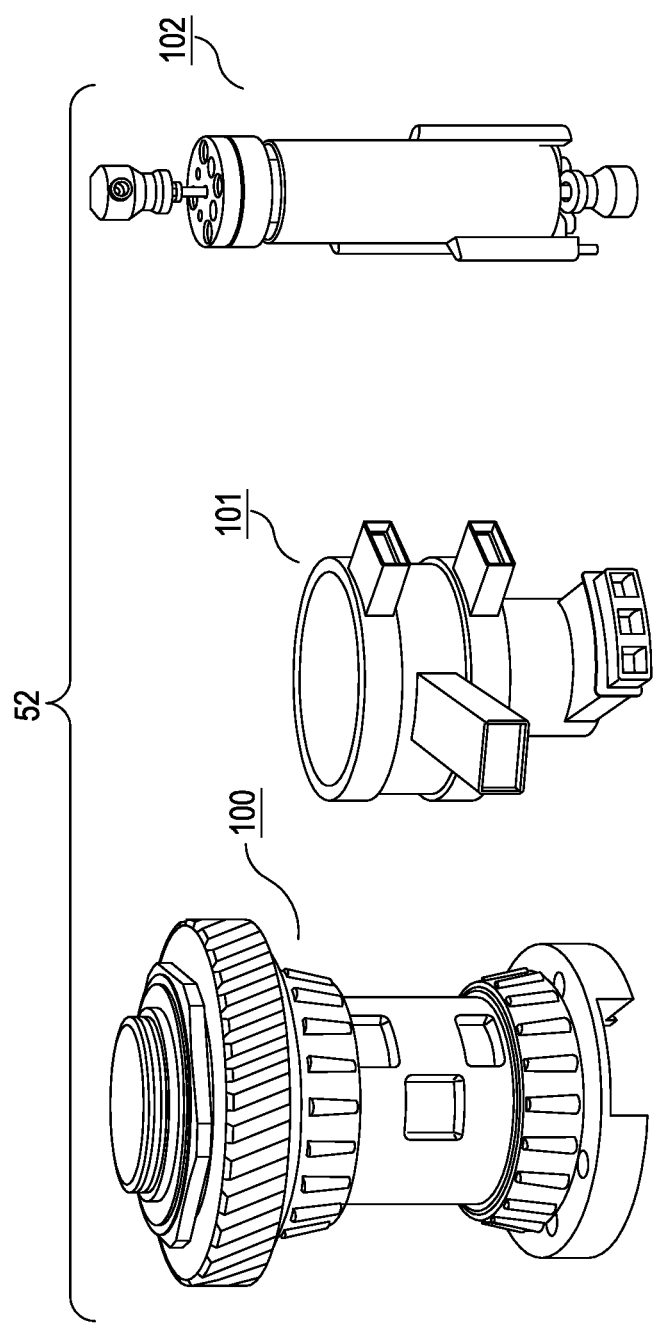
FIG. 10 illustrates components of a rotatable interface unit according to an embodiment of the present invention.

As illustrated in FIG. 10, the rotating interface unit 52 includes a mechanical interface 100, an electric interface 101, and a fluid interface 102 that operate together to allow the in-wheel electric motor 16 and associated components to be provided with necessary resources to operate while also be steering to allow the vehicle to be maneuvered.

The mechanical interface 100 is arranged to allow rotation of the rotating interface unit 52. The electric interface 101 is arranged to allow control signals to be communicated between the vehicle and the in-wheel electric motor 16 and other electrical components attached to the drive arrangement 10, and for providing a high voltage line to allow the vehicle battery to provide current to the in-wheel electric motor 16 for allowing the in-wheel electric motor 16 to generate a drive torque. The fluid interface 102 is arranged to communicate various fluids between the drive arrangement components and the vehicle, for example cooling fluid for the in-wheel electric motor 16, air for the suspension system 13, and hydraulics for the brake system 14.

FIG. 11a illustrates an embodiment of the mechanical interface 100 in an assembled condition, while FIG. 11b illustrates an exploded view of the mechanical interface 100. The mechanical interface 100 includes a hollow cylindrical portion 110 having a lower flange 111 that includes seven apertures 112 for bolting the mounting arm 12 to the rotatable interface 11. Mounted on the upper surface of the lower flange 111 is a first thrust bearing 113, where the outer surface of bearings incorporated within the thrust bearing 113 are arrange to contact the mounting plate 50. Longitudinally separated from the first thrust bearing 113 is a second thrust bearing 114, where the outer surface of bearings incorporated within the second thrust bearing 114 are arrange to contact a housing for the rotating interface unit. The lower surface of the second thrust bearing 114 is arrange to engage with an upper lip 115 formed on the hollow cylindrical portion 110.

Mounted on top of the second thrust bearing 114 are a series of washers and locking nuts 116 to retain the second thrust bearing to the hollow cylindrical portion 110. Mounted above the series of washers and locking nuts 116 is the cog wheel 90. The inner surface of the cog wheel 90 has engagement elements arranged to engage with corresponding elements formed on the hollow cylindrical portion 110 to prevent the cog wheel 90 rotating relative to the hollow cylindrical portion 110. Mounted on top of the cog wheel 90 are a series of washers, locking nut and retaining rings 117 arranged to retain the cog wheel 90 to the hollow cylindrical portion 110.

Figure 12B:
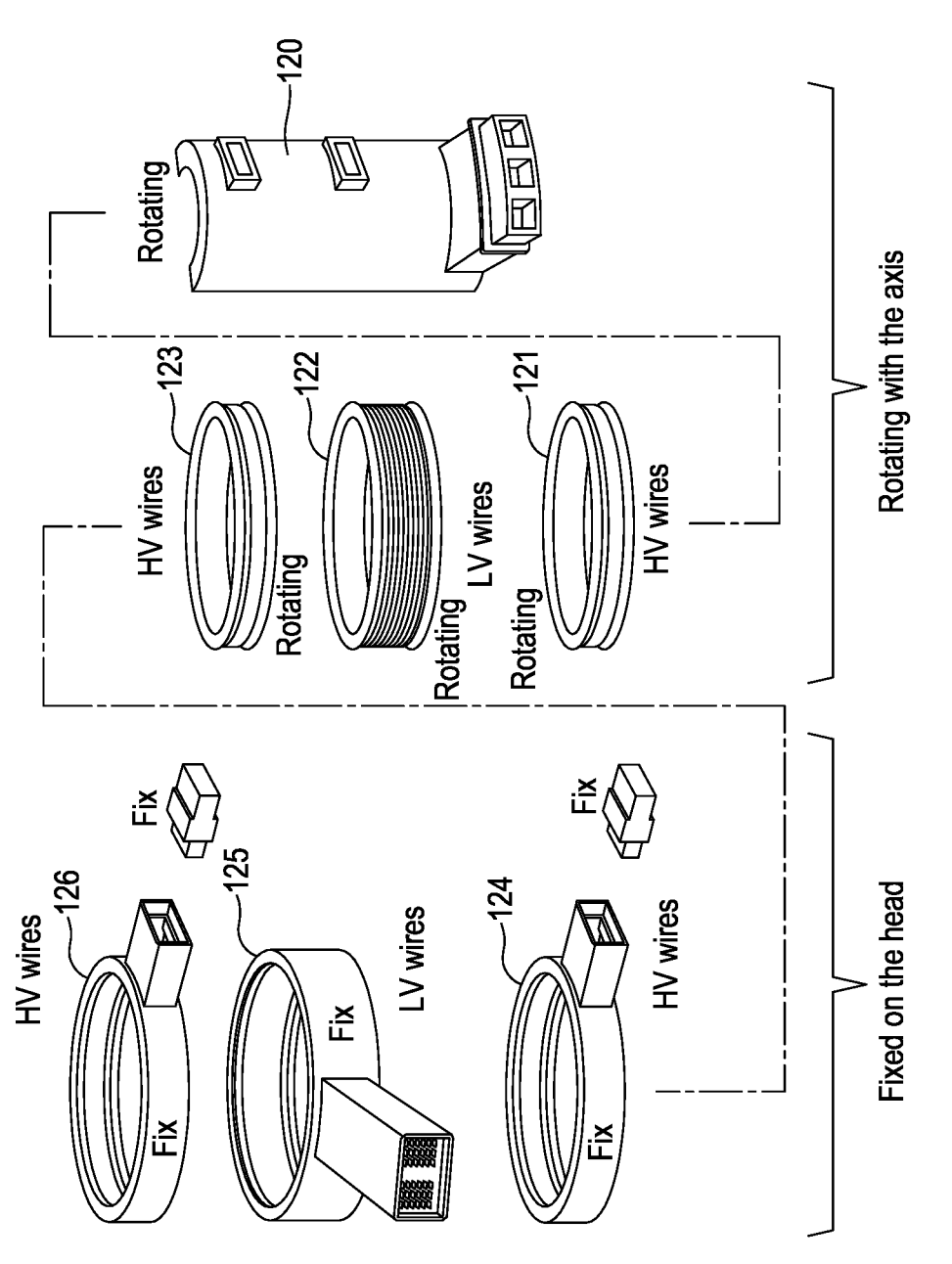
FIG. 12 illustrates an electrical interface according to an embodiment of the present invention.
Figure 12A:
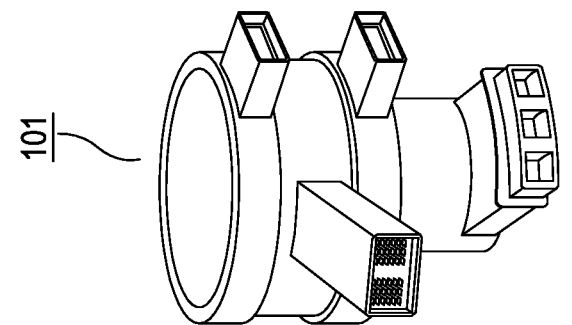
Figure 13:
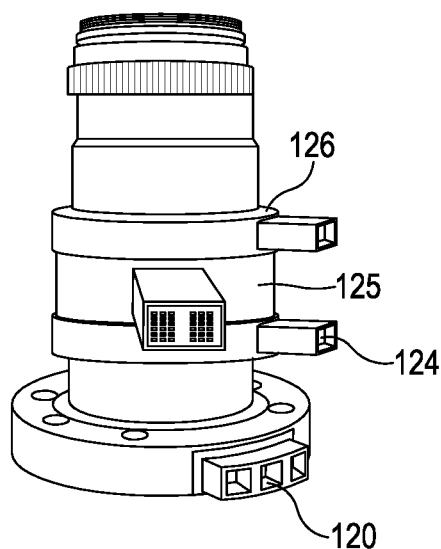
FIG. 13 illustrates an electrical interface according to an embodiment of the present invention.

FIG. 12a illustrates a perspective view of an embodiment of the electrical interface 101, while FIG. 12b illustrates an exploded view of the electrical interface 101. The electrical interface 101 includes an inner electrical housing 120, three annular conductive elements 121, 122, 123 and three electrical connectors 124, 125, 126, where FIG. 13 illustrates a perspective view of the electrical interface mounted on the hollow cylindrical portion 110 and FIG. 14 illustrates a cross sectional view of the hollow cylindrical portion 110 and electrical interface 101 configuration.

Figure 14:
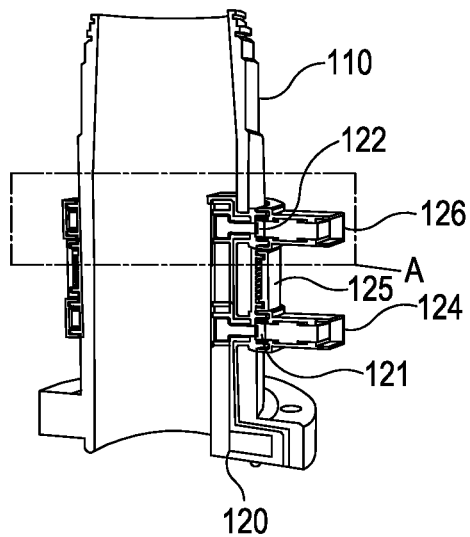
FIG. 14 illustrates an electrical interface according to an embodiment of the present invention.

As illustrated in FIG. 14, the inner electrical housing 120 is arranged to be mounted within the hollow cylindrical portion 110, and as such is arranged to rotate with the hollow cylindrical portion 110.

Figure 15:
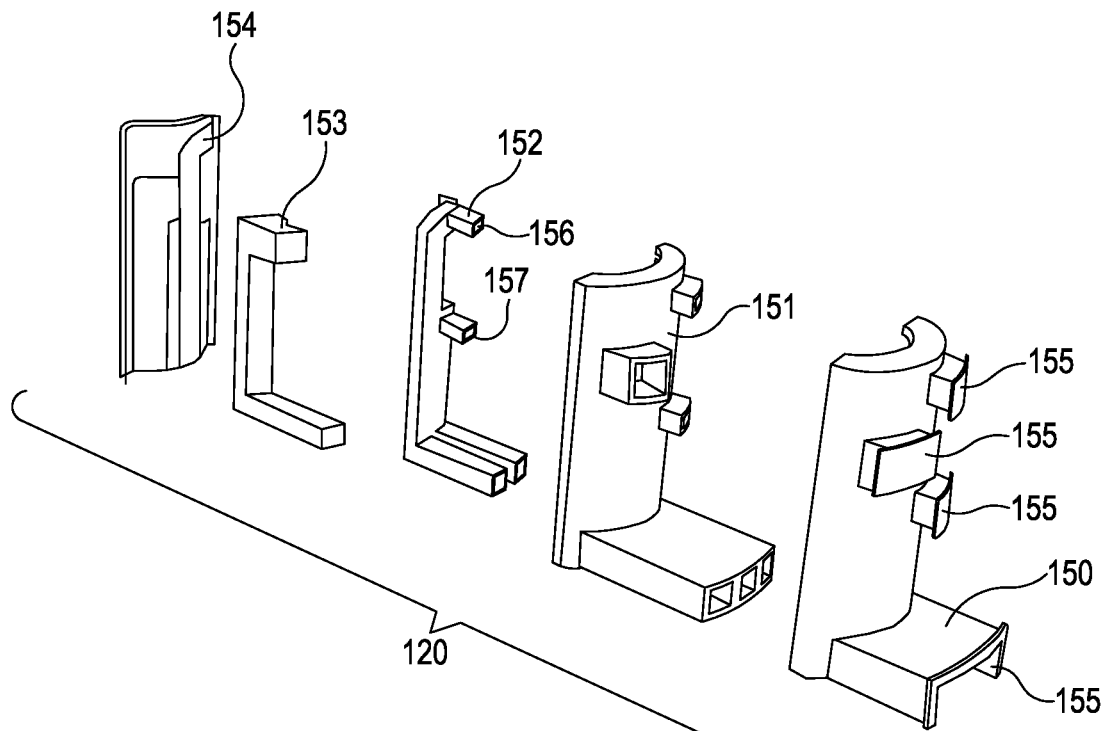
FIG. 15 illustrates an electrical interface according to an embodiment of the present invention.

As illustrated in FIG. 15, the inner electrical housing 120 includes an insulator section 150, a main housing section 151, an high voltage wiring section 152, a low voltage wiring section 153 and a back cover 154.

The insulator section 150 is mounted on the inner surface of the hollow cylindrical portion 110 and includes four apertures 155 that are arranged to extend through corresponding apertures formed in the hollow cylindrical portion 110 to allow access to the high voltage wiring section 152 and the low voltage wiring section 153, as described below. The insulator section 150 is arranged insulate the inner electrical housing 120 from the hollow cylindrical portion 110.

Mounted on an inner surface of the insulator section 150 is the main housing section 151, where the main housing section 151 is arranged to house the high voltage wiring section 152 and the low voltage wiring section 153. To allow the main housing section 151 to be mounted to the insulator section 150, the outer surface of the main housing section 151 has a complementary shape to the inner surface of the insulator section 150. As with the insulator section 150, the main housing section 151 includes apertures to allow access to the high voltage wiring section 152 and the low voltage wiring section 153. Both the insulator section 150 and the main housing section 151 have a lower extended section that is arranged to extend through a cut-away section of the hollow cylindrical portion 110, as illustrated in FIG. 13.

As stated above, mounted within the main housing section 151 are the high voltage wiring section 152 and the low voltage wiring section 153. The high voltage wiring section 152 is arranged to act as an electrical interface between the in-wheel electric motor 16 and the battery housed within the vehicle for providing a high voltage from the vehicle battery to the in-wheel electric motor 16. The high voltage wiring section includes two voltage busbars, one positive voltage busbar 156 and one negative voltage busbar 157. The low voltage wiring section is arranged to allow low voltage control signals to be communicated between the vehicle and electrical components within the drive arrangement.

Both ends sections of the positive voltage busbar 156 and both end sections of the negative voltage busbar 157 are arranged to extend through a respective aperture formed in the main housing section 151 and the insulator section 150. Similarly, the end sections of the low voltage wiring section 153 are arranged to extend through a respective aperture formed in the main housing section 151 and the insulator section 150.

Figure 16:
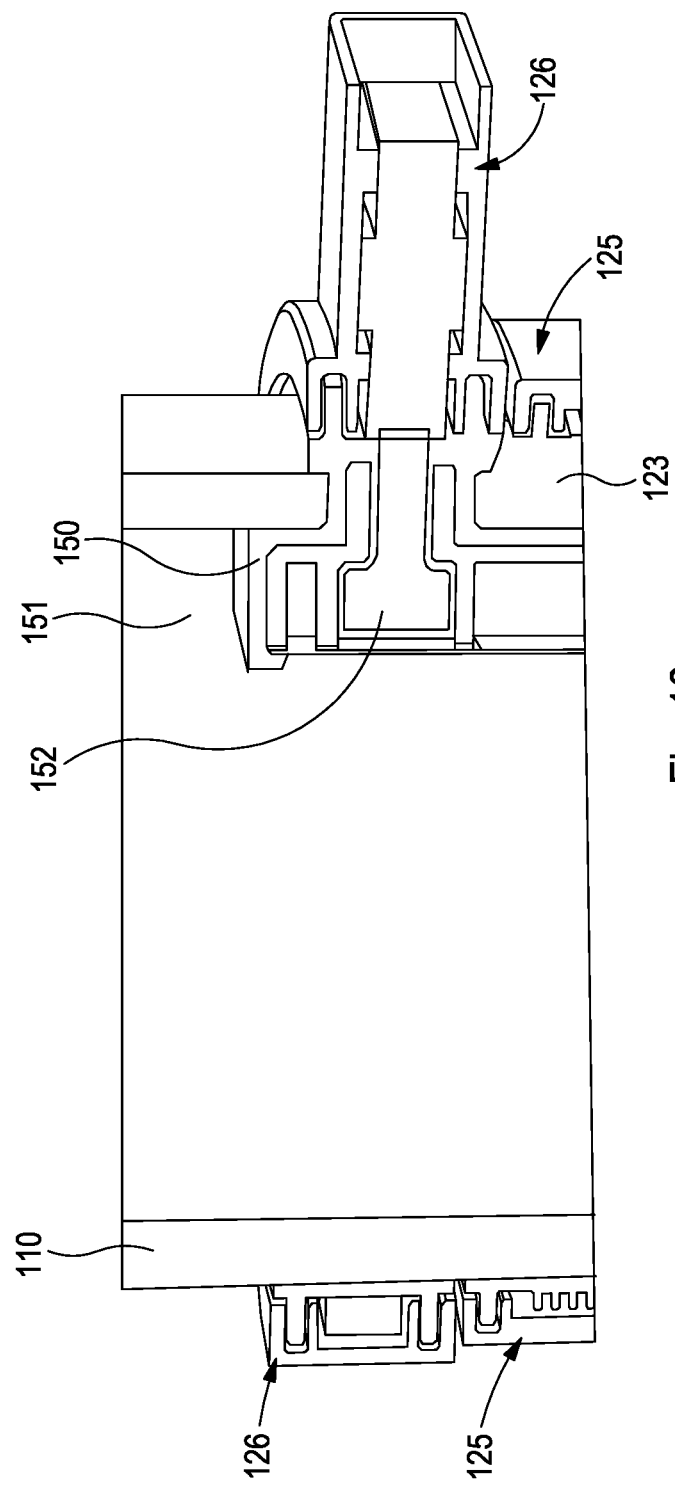
FIG. 16 illustrates an electrical interface according to an embodiment of the present invention.

As illustrated in greater detail FIG. 16, which represents an enlarged section A of FIG. 14, the three annular conductor elements 121, 122, 123 are arranged to be mounted over an end section of the positive voltage busbar 156, the negative voltage busbar 157 and the low voltage wiring section respectively such that the respective annular conductor elements are in electrical contact with the respective end sections. For the purposes of FIG. 16, this illustrates a cross sectional view of the hollow cylindrical portion 110 and the electrical interface 101 corresponding to one end of the high voltage section, which illustrates the high voltage busbar being in contact with an annular conductor element 123, which are both arranged to rotate with the hollow cylindrical portion 110. In turn, the annular conductor element 123 is also in contact with a conductor within the electrical conductor 126, where position of the electrical conductor 126 is arranged to be fixed with respect to the vehicle and does not rotate with the hollow cylindrical portion 110. In a preferred embodiment, the annular conductor elements 121, 122, 123 incorporate electrical conductive fluid, where the electrical conductive fluid provides a conductive path between the high and low voltage sections of the inner electrical housing 120 and the respective three electrical connectors 124, 125, 126.

With regard to the low voltage wiring section 153, typically this will have a plurality of electrical conductors, one for each required low voltage signal, consequently the annular conductor element 122 associated with the low voltage wiring section 153 will have a corresponding plurality of separate annular conductive strips that are arranged to be in electrical contact with a respective electrical conductor formed within the low voltage wiring section 153.

As illustrated in FIG. 13 and FIG. 14, each of the three electrical connectors 124, 125, 126 are arranged to be mounted over a respective annular conductor element 121, 122, 123, where each electrical connector 124, 125, 126 is arranged to be in electrical contact with the respective annular conductor element 121, 122, 123, thereby allow an electrical circuit to be established between the three electrical connectors 124, 125, 126 and the positive voltage busbar 156, the negative voltage busbar 157 and the low voltage wiring section 153 respectively.

The rotational orientation of the three electrical connectors 124, 125, 126 is arranged to be fixed with respect to the vehicle. In other words, as the cylindrical hollow portion 110 of the mechanical interface 100 is caused to rotate by the electric motor in the steering electric motor unit 51, the three electrical connectors 124, 125, 126 are arranged to remain fixed while the cylindrical hollow portion is rotating.

The other end sections of the positive voltage busbar 156, the negative voltage busbar 157 and the low voltage wiring section 153 are arranged to extend through a respective aperture in the main housing section and the insulator section, which are arranged to extend through the lower cut out section of the hollow cylindrical portion 110. The end sections of the positive voltage busbar 156, the negative voltage busbar 157 and the low voltage wiring section 153 are arranged to receive an electrical connector (not shown), wherein the electrical connector is arranged to rotate with the hollow cylindrical portion 110 of the mechanical interface 100. The electrical connector (not shown) is arranged to connect the positive voltage busbar 156 and the negative voltage busbar 157 to the in-wheel electric motor 16 and connecting the low voltage wiring section 153 to the in-wheel electric motor 16 and any other electrical components that require a low voltage signal.

Figure 17:
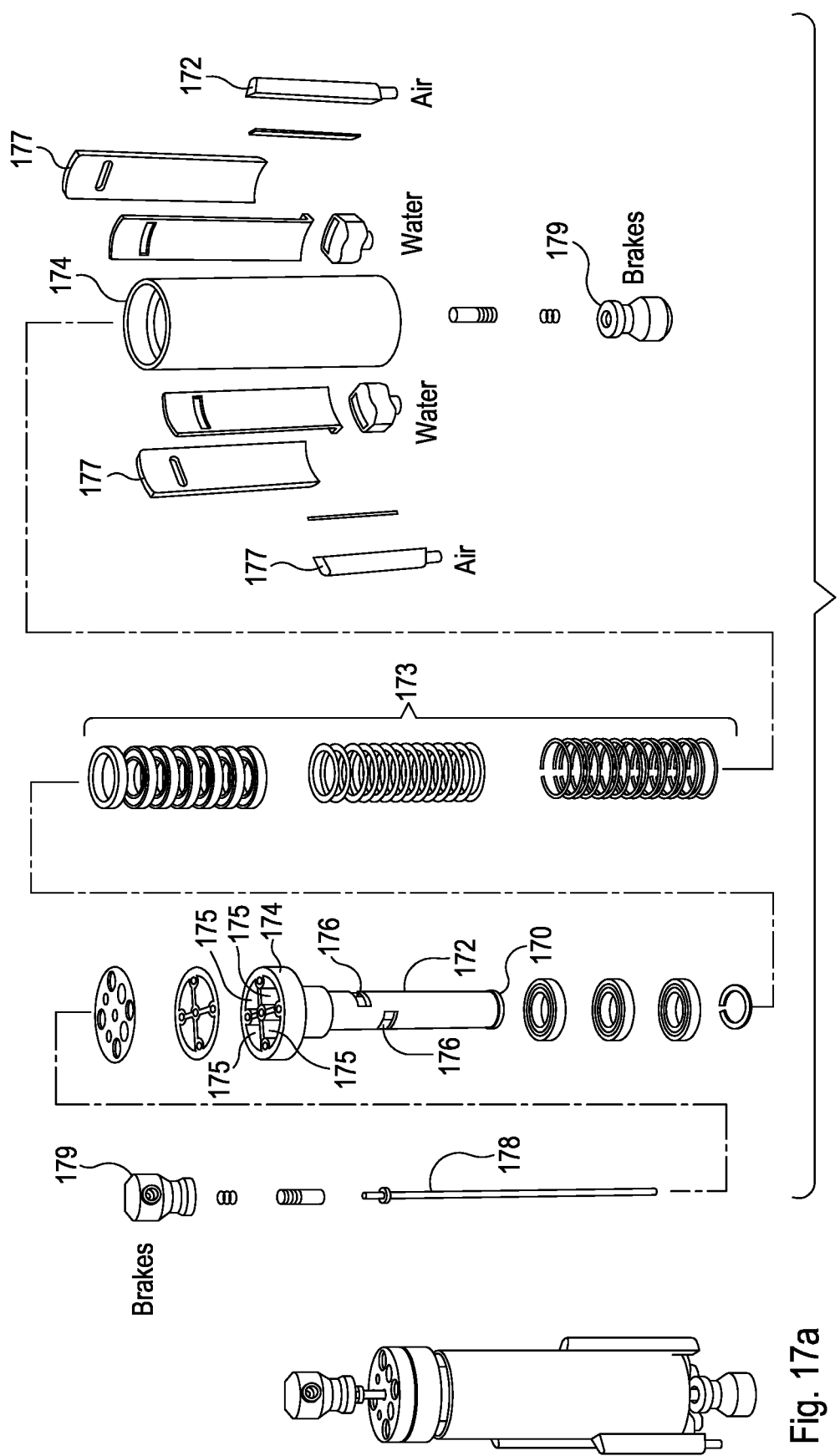
FIG. 17 illustrates a fluid interface according to an embodiment of the present invention.
Figure 18:
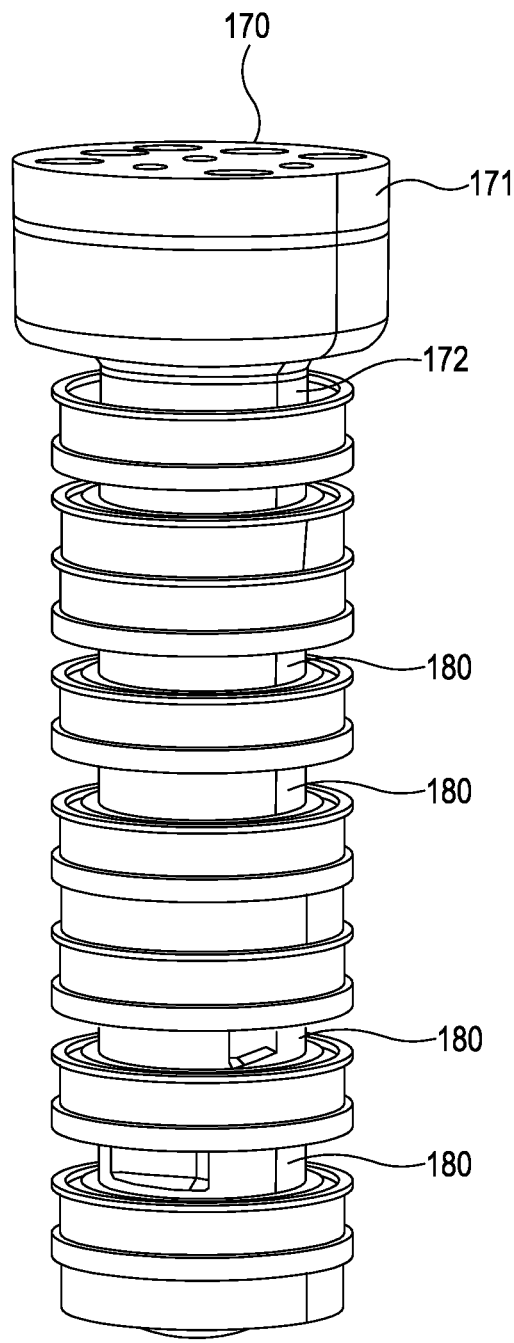
FIG. 18 illustrates a fluid interface according to an embodiment of the present invention.

FIG. 17a illustrates a perspective view of an embodiment of the fluid interface 102, while FIG. 17b illustrates an exploded view of the fluid interface 102. The fluid interface 102 includes a first fixed fluid element 170 having an inlet portion 171 and an outlet portion 172, components 173 for creating sealed annular channels 180 around the outlet portion 172 of the first fixed fluid element 170, as illustrated in FIG. 18, a first rotating fluid element 174 and a central fluid conduit 178. As would be appreciated by a person skilled in the art, the fluid conduits within the fluid interface allow fluid to travel in both directions, as such in the context of the present embodiment the use of the terms 'inlet' and 'outlet' with regard to fluid flow are interchangeable.

The fluid interface 102 is arranged to be mounted along the axis of the hollow cylindrical portion 110, where the inlet portion 171 of the first fixed fluid element 170 extends through the top of the mechanical interface, as illustrated in FIG. 9.

Figure 19D:
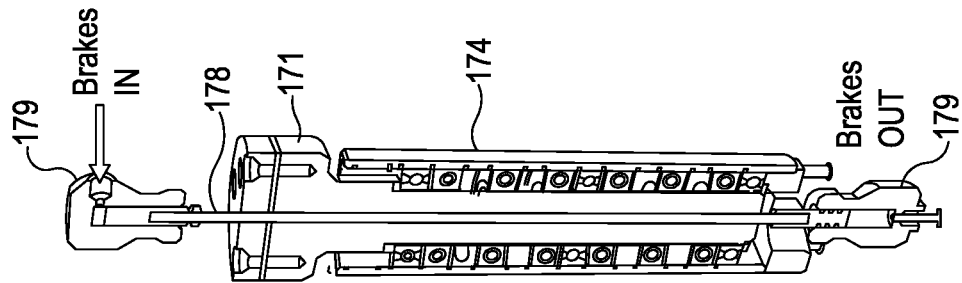
FIG. 19 illustrates a fluid interface according to an embodiment of the present invention.
Figure 19C:
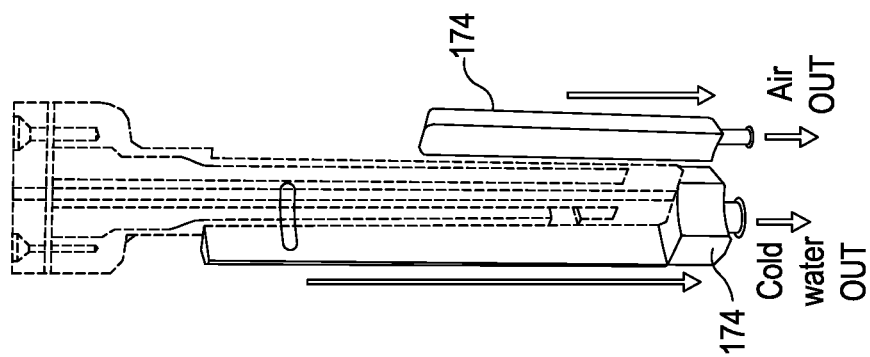

For the purposes of the present embodiment, the first fluid element 170 includes four fluid conduits 175. Two of the four fluid conduits 175 are for water flow to and from the in-wheel electric motor 16 and are used for the purposes of cooling the in-wheel electric motor 16. The other two fluid conduits are for air flow to the suspension system 13 incorporated within the drive arrangement. Outlet apertures 176 for the respective fluid conduits 175 are formed at different axial positions along the outlet portion 172 of the first fluid element 170, as illustrated in FIG. 17b and FIG. 19a.

Components 173 for creating sealed annular channels 180 are placed around the conduit apertures 176 formed in the outlet portion 172 of the first fixed fluid element 170, where the components 173 for the sealed annular channels 180 create a seal between the first fluid element 170 and the first rotating fluid element 174. For the purposes of the present embodiment, the components 173 include a plurality of bearings and washers, which are retained in placed via metal clips, as illustrated in FIG. 17b, where as stated above the components 173 form sealed annular channels 180 between the first fluid element 170 and the first rotating fluid element 174 around each conduit aperture 176 formed in the outlet portion 172 of the first fixed fluid element 170.

The first rotating fluid element 174 includes a respective aperture (not shown) for each fluid conduit 175 formed in the first fixed fluid element 170. Each of the apertures formed in the first rotating fluid element 174 are positioned at the same axial position as a respective sealed annular channel 180 formed around an aperture 176 in the outlet portion 172 of the first fixed fluid element 170, thereby allowing fluid to enter into the respective fluid conduits 175 formed in the first fixed fluid element 170 via the inlet portion 171, which is rotationally fixed with respect to the vehicle, and allow fluid to exit from first fixed fluid element 170 for each of the fluid conduits 175, while the first rotating fluid element 174 is arranged to rotate in synchronisation with the cylindrical hollow portion 110 of the mechanical interface 100.

Preferably, mounted on the external surface of the first rotating fluid element 174 are additional fluid conduits 177 for channeling the respective fluid flows to the bottom section of the mechanical interface 100 to allow easy access for coupling the respective fluid flows to piping mounted within the mounting arm 12 for communicating the respective fluid flows between the vehicle and the in-wheel electric motor 16 and the vehicle and the suspension system 13 and/or brake 14.

The central fluid conduit 178 is mounted along the axis of the first fixed fluid element 170 and, as with the first fixed fluid element 170, its rotational position is fixed with respect to the vehicle. Attached at each end of the central fluid conduit 178 are rotatable fluid coupling elements 179, where in a preferred embodiment the central fluid conduit 178 is used for hydraulic fluid for operation of the disc brake 14 attached to the in-wheel electric motor.

FIGS. 19a, 19b, 19c and 19d represent cross sectional views of the fluid interface 102, where different components for the fluid interface within the figures have been made transparent to help illustrate fluid flow through the fluid interface.

FIG. 19a illustrates fluid within the conduits 175 of the first fixed fluid element, where the fluid exits the conduits 175 through apertures 176 into a respective sealed channel.

Figure 19B:
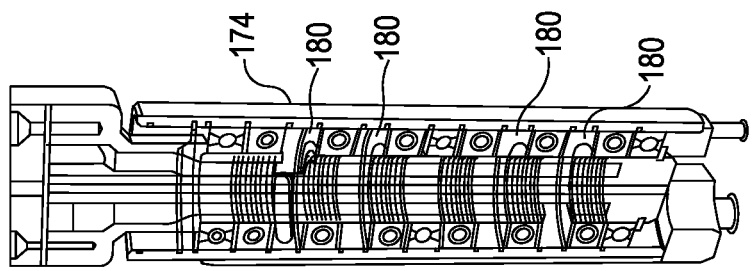
Figure 19A:
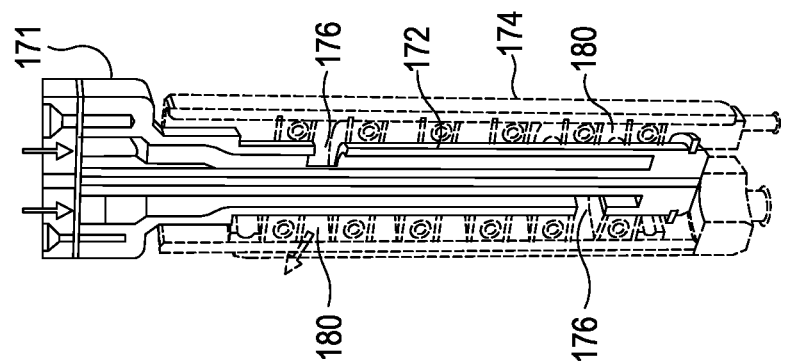

FIG. 19b illustrates fluids within each of the respective four sealed channels 180, where the fluid flows around each of the sealed channels 180.

FIG. 19c illustrates the fluid exiting the respective sealed channels through the respective apertures formed in the first rotating fluid element 174, where as the first rotating fluid element 174 rotates with respect to the first fixed fluid element 170 the fluid exits from the respective sealed channels at different positions relative to the first fixed fluid element 170 corresponding to the position of the respective apertures formed in the first rotating fluid element 174. Once the fluid has entered the first rotating fluid element 174 the fluid is channel through the additional fluid conduits 177.

FIG. 19d illustrates the central fluid conduit 178 having a rotatable fluid coupling elements 179 mounted at each end of the central fluid conduit 178.

Figure 20:
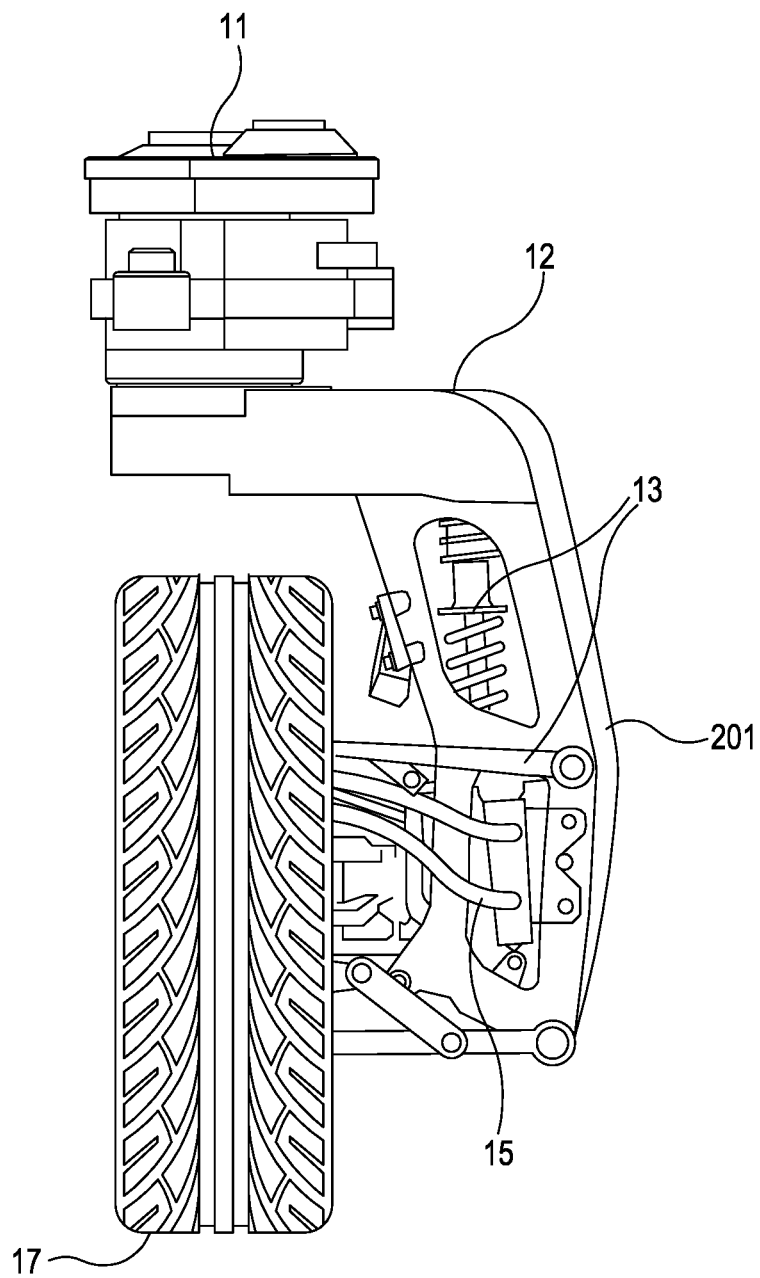
FIG. 20 illustrates a drive arrangement according to an embodiment of the present invention.

As described above, the mounting arm 12, otherwise known as steering arm, is attached to the rotatable interface 11 to allow the mounting arm 12 to be rotated continuously relative to the vehicle. As illustrated in FIG. 20, the mounting arm 12 is substantially L shaped in configuration, where the lower section of the mounting arm 12 is coupled to an in-wheel electric motor 16 via a wishbone configuration. In turn, the in-wheel electric motor 16 is coupled to a wheel/tyre 17 configuration. Preferably, the dimensions of the mounting arm 12 are chosen such that when the mounting arm 12 is being rotated through 360 degrees, the volume swept out by mounting arm 12 does not exceed the radius of the tyre 17 attached to the in-wheel electric motor 16, where the centre of the tyre contact point with the road surface is preferably located below the rotational axis of the rotatable interface.

For the purposes of the present embodiment, the suspension system 13 includes a hydraulic damper and suspension spring and a double wishbone arrangement. The hydraulic damper and suspension spring is mounted within the mounting arm 12, where the upper end of the hydraulic damper is coupled to an upper section of the mounting arm 12 with the lower end of the hydraulic damper being coupled to the double wishbone arrangement, which in turn is coupled to both the mounting arm 12 and the in-wheel electric motor 16, as illustrated in FIG. 20. The suspension system 13 provides dampening between oscillations of the wheel/in-wheel electric motor 16 and the vehicle. The use of compressed air available via the fluid interface 102 allows an active suspension to be used, which can provide a smooth, constant ride quality or allow the characteristics of the suspension system to be modified based on the use of the vehicle.

In a preferred embodiment, the motor attached to the drive arrangement is of the type having a set of coils being part of the stator for attachment to a vehicle, radially surrounded by a rotor carrying a set of magnets for attachment to a wheel, where preferably the integrated temperature sensor is arranged to measure the temperature of the coils. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. As would be appreciated by a person skilled in the art, the present invention is applicable for use with other types of electric motors.

Figure 21:
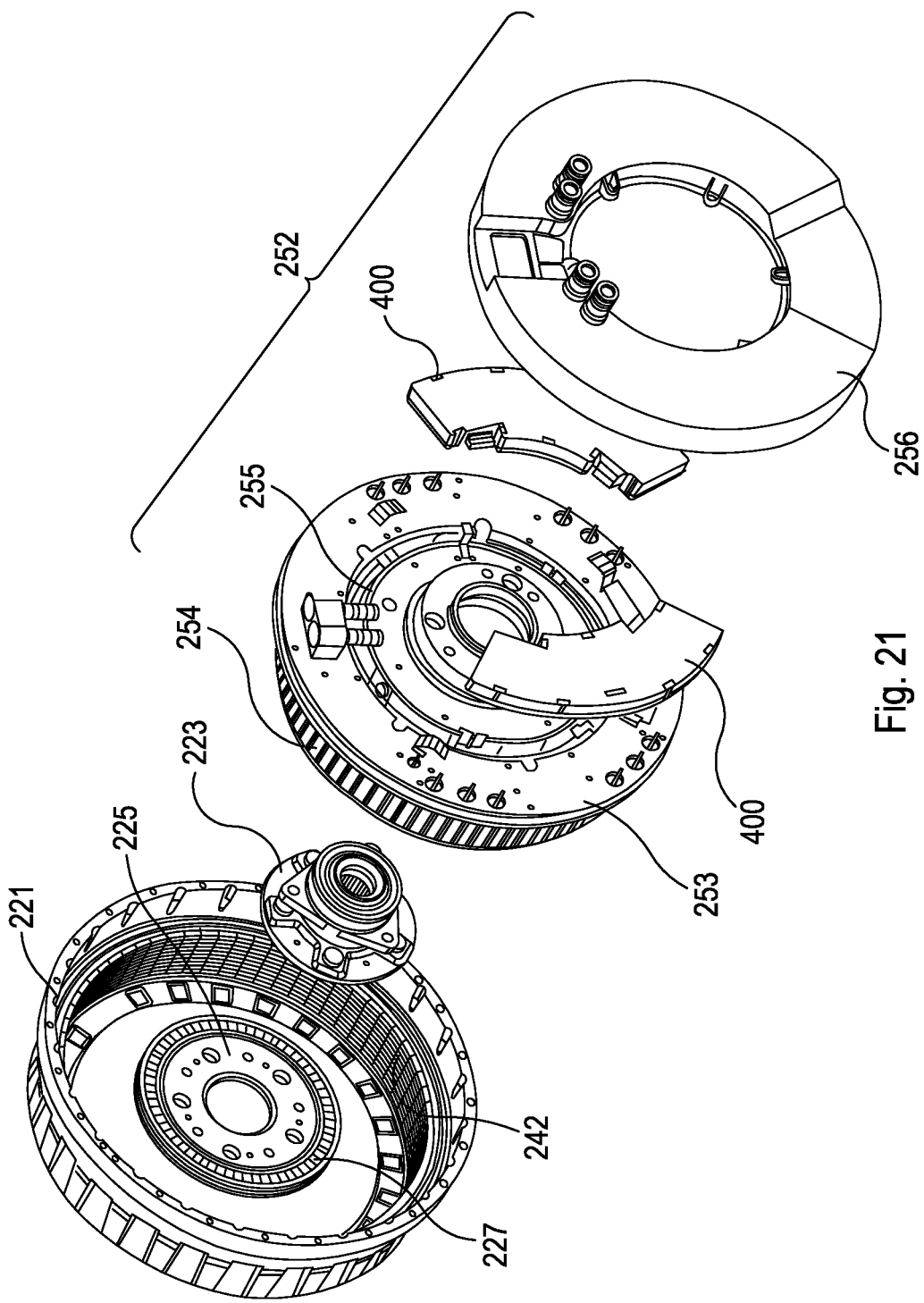
FIG. 21 illustrates an exploded view of an electric motor as used in an embodiment of the present invention.

For the purposes of the present embodiment, as illustrated in FIG. 21, the in-wheel electric motor includes a stator 252 comprising a heat sink 253, multiple coils 254 and an electronics module 255 mounted in a rear portion of the stator for driving the coils. The coils 254 are formed on stator tooth laminations to form coil windings, as described below. A stator cover 256 is mounted on the rear portion of the stator 252, enclosing the electronics module 255 to form the stator 252, which may then be fixed to a vehicle and does not rotate relative to the vehicle during use.

Figure 23:
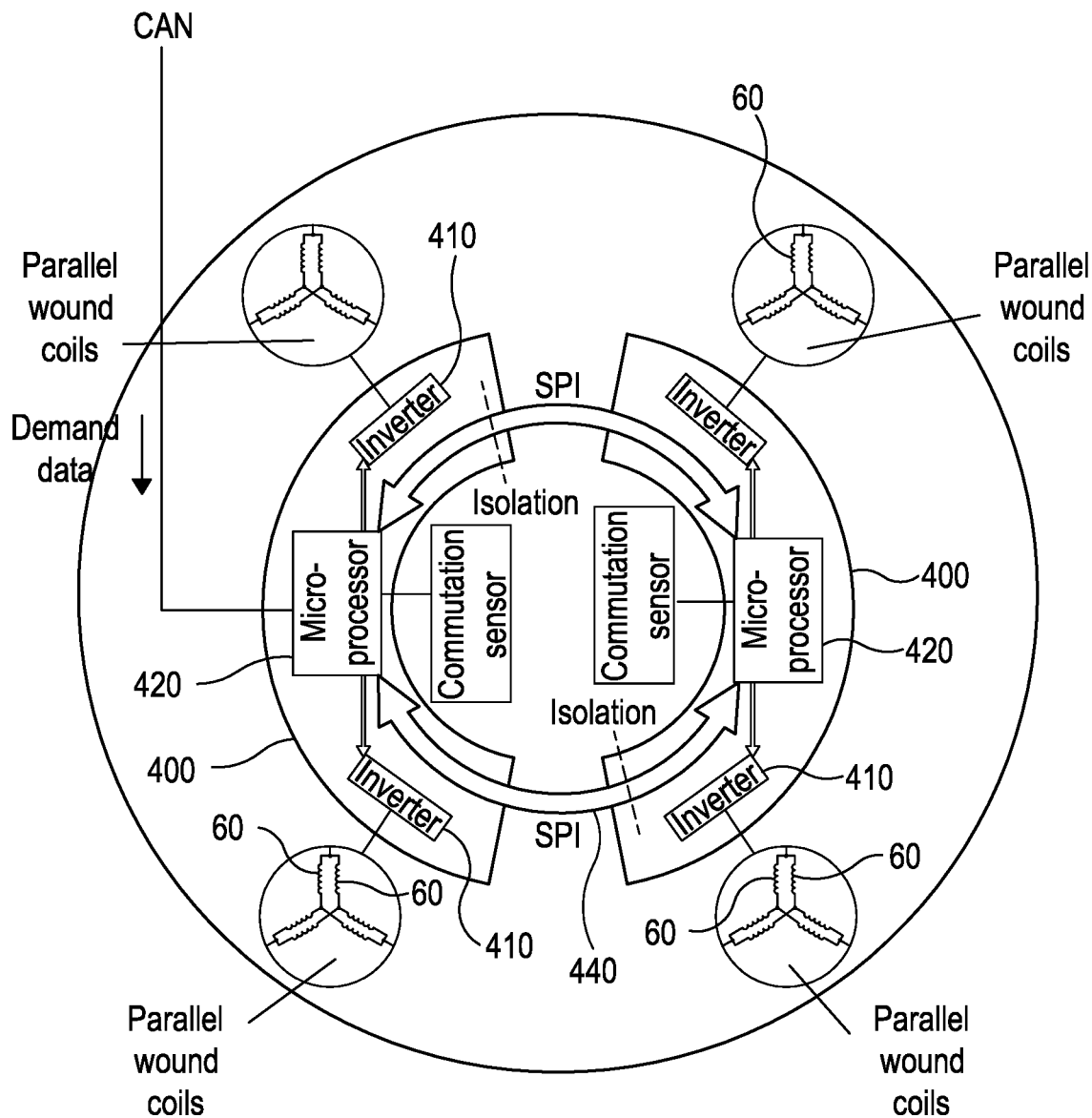
FIG. 23 illustrates an electric motor according to an embodiment of the present invention.

The electronics module 255 includes two control devices 400, where each control device 400 includes two inverters 410 and control logic 420, which in the present embodiment includes a processor, for controlling the operation of both inverters 410, as illustrated in FIG. 23. Although in the present embodiment the electronics module 255 includes two control devices, equally the electronics module 255 may include a single control device or more than two control devices.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coil windings on the stator 252 so that magnetic fields generated by the coils interact with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

Attached to the rotor is a brake disc with a brake caliper, for applying a brake torque to the brake caliper, being mounted on the stator and/or the mounting arm. As described above, in a preferred embodiment, hydraulic fluid for operating the brake system is delivered from the vehicle via the fluid interface of the rotatable interface. Alternatively, if a brake by wire system is utilised, control signal for operating the brake system may be received from the vehicle via the electrical interface of the rotatable interface.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Figure 22:
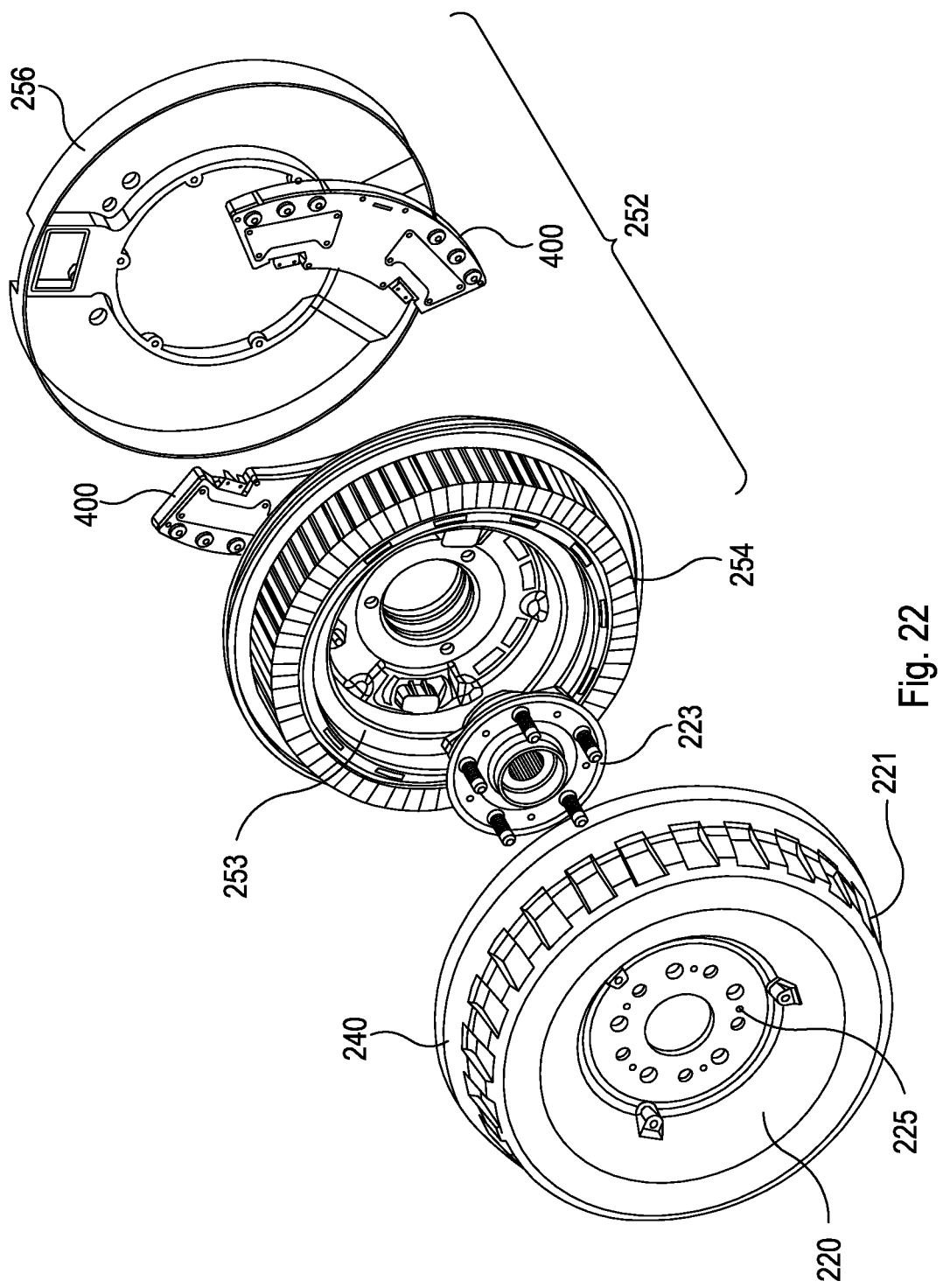
FIG. 22 illustrates an exploded view of the electric motor shown in FIG. 1 from an alternative angle.

FIG. 22 shows an exploded view of the same assembly as FIG. 21 from the opposite side showing the stator 252 and rotor. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

A V shaped seal is provided between the circumferential wall 221 of the rotor and the outer edge of the stator.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnets or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

A sensor, which in this embodiment is a Hall sensor, is mounted on the stator. The sensor is positioned so that as the rotor rotates each of the commutation magnets that form the commutation magnet ring respectively rotates past the sensor.

As the rotor rotates relative to the stator the commutation magnets correspondingly rotate past the sensor with the Hall sensor outputting an AC voltage signal, where the sensor outputs a complete voltage cycle of 360 electrical degrees for each magnet pair that passes the sensor.

For improved position detection, preferably the sensor include an associated second sensor placed 90 electrical degrees displaced from the first sensor.

The motor 40 in this embodiment includes four coil sets 60 with each coil set 60 having three coil sub-sets that are coupled in a wye configuration to form a three phase sub-motor, resulting in the motor having four three phase sub-motors. A first control device is coupled to two coil sets with a second control device being coupled to the other coil sets, where each inverter in the respective control devices is arranged to control current in a respective coil set. However, although the present embodiment describes an electric motor having four coil sets 60 (i.e. four sub motors) the motor may equally have two or more coil sets with associated control devices (i.e. two or more sub motors). For example in a preferred embodiment the motor 40 includes eight coil sets 60 with each coil set 60 having three coil sub-sets that are coupled in a wye configuration to form a three phase sub-motor, resulting in the motor having eight three phase sub-motors.

FIG. 23 illustrates the connections between the respective coil sets 60 and the control devices 400 housed in the electronics module 255, where a respective coil set 60 is connected to a respective three phase inverter 410 included on a control device 400. As is well known to a person skilled in the art, a three phase inverter contains six switches, where a three phase alternating voltage may be generated by the controlled operation of the six switches.

As stated above, the electronics module 255 includes two control devices 400, with each control device 400 having two inverters 410 that are coupled to a coil set 60. Additionally, each control device 400 includes an interface arrangement, where in a first embodiment the interface arrangement on each control device 400 is arranged to allow communication between the respective control devices 400 housed in the electronics module 255 via a communication bus with one control device 400 being arranged to communicate with a vehicle controller mounted external to the electric motor. The processor 420 on each control device 400 is arranged to handle communication over the interface arrangement.

The processors 420 on the respective control devices 400 are arranged to control both inverters 410 mounted in the respective control device 400 to allow each of the electric motor coil sets 60 to be supplied with a three phase voltage supply, thereby allowing the respective coil sub-sets to generate a rotating magnetic field. Although the present embodiment describes each coil set 60 as having three coil sub-sets the present invention is not limited by this and it would be appreciated that each coil set 60 may have one or more coil sub-sets.

Under the control of the respective processors 420, each three phase bridge inverter 410 is arranged to provide PWM voltage control across the respective coil sub-sets, thereby generating a current flow in the respective coil sub-sets for providing a required torque by the respective sub-motors.

As stated above, PWM switching is used to apply an alternating voltage to the electric motors coil windings, where the amplitude of the voltage applied across the coil windings is dependent upon the rotor speed. The torque applied to the rotor results from phase current within the coil windings, where motor torque is a function of the amplitude of the phase current and the phase angle. In other words for a three phase motor:

$$T=f(I_u,I_v,I_w,\theta)$$

As stated above, PWM control works by using the motor inductance to average out an applied pulse voltage to drive the required current into the motor coils. Using PWM control an applied voltage is switched across the motor windings. During the period when voltage is switched across the motor coils, the current rises in the motor coils at a rate dictated by their inductance and the applied voltage. The PWM voltage control is switched off before the current has increased beyond a required value, thereby allowing precise control of the current to be achieved.

For a given coil set 60 the three phase bridge inverter 410 switches are arranged to apply a single voltage phase across each of the coil sub-sets.

The inverter switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and form a leg of the three phase bridge circuit.

Figure 24:
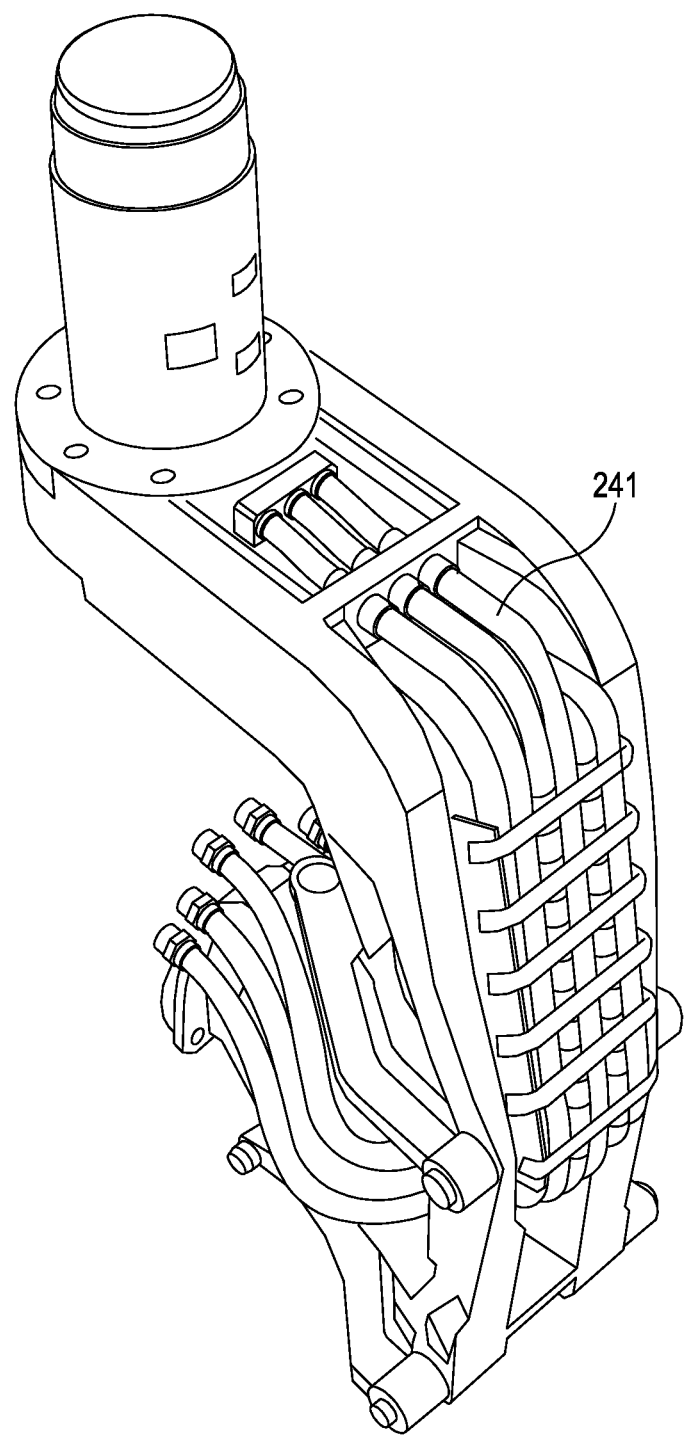
FIG. 24 illustrates a drive arrangement according to an embodiment of the present invention.

As discussed above, the fluid and electrical requirements for the in-wheel electric motor 16 and other components mounted within the drive arrangement are provided via the fluid interface 102 and electrical interface 101 of the rotatable interface 11, where the respective conduits and cables required for communicating the fluid and electrical supplies between the rotatable interface 11 and the respective components mounted within the drive arrangement are mounted in a recess section 241, as illustrated in FIG. 24, formed on the side portion of the mounting arm 12, which is then covered with a mounting plate 201, as illustrated in FIG. 20, thereby retaining the majority of the respective conduits and cables within the space envelope of the mounting arm 12.

The invention claimed is:

1. A drive arrangement for a vehicle, the drive arrangement comprising:
a rotatable interface arranged to be mounted to the vehicle, wherein the rotatable interface is rotatably coupled to a mounting arm to allow continuous rotation of the mounting arm in a clockwise and anti clockwise direction that is substantially perpendicular to the longitudinal and transverse axis of the vehicle; and
a first electric motor having a stator and a rotor, wherein the stator is coupled to the mounting arm to allow the axis of the rotor to be substantially perpendicular to the rotational axis of the rotatable interface, wherein the rotor is arranged to be coupled to a wheel of the vehicle to allow the electric motor to provide drive torque to the wheel;
wherein the rotatable interface includes a first fluid interface for providing cooling to the electric motor from the vehicle; and
wherein an inlet of the first fluid interface is continuously rotatable relative to an outlet of the first fluid interface.

2. The drive arrangement according to claim 1, wherein the rotatable interface includes a second electric motor for controlling the rotational position of the mounting arm.

3. The drive arrangement according to claim 2, wherein an axis of rotation of the second electric motor is offset with respect to the axis of rotation of the rotatable interface.

4. The drive arrangement according to claim 2, wherein a first cogwheel is coupled to the second electric motor that is arranged to engage with a second cogwheel attached to the rotatable interface to allow the second electric motor to rotate the rotatable interface.

5. The drive arrangement according to claim 1, wherein the rotor includes a brake disc.

6. The drive arrangement according to claim 1, wherein the mounting arm includes a suspension spring damper for damping oscillations of the electric motor.

7. The drive arrangement according to claim 1, wherein the rotatable interface includes an electrical interface for providing from the vehicle to the electric motor a first voltage for driving the electric motor and control signals for controlling the operation of the electric motor.

8. The drive arrangement according to claim 7, wherein the mounting arm incudes a recess for mounting electrical cables for channeling the electrical cables from the rotatable interface to the electric motor and/or wherein electrical cables for channeling the electrical cables from the rotatable interface to the electric motor are substantially static with respect to the mounting arm while electrical cables from the vehicle to the rotatable interface are substantially static with respect to the vehicle.

9. The drive arrangement according to claim 1, wherein the mounting arm includes a recess for mounting piping for channeling the first fluid from the rotatable interface to the electric motor for cooling of the electric motor and/or wherein piping for channeling the first fluid from the rotatable interface to the electric motor are substantially static with respect to the mounting arm while piping for channeling the first fluid from the vehicle to the rotatable interface are substantially static with respect to the vehicle.

10. The drive arrangement according to claim 1, wherein the rotatable interface includes a second fluid interface for providing braking fluid from the vehicle for operating a brake caliper attached to the electric motor.

11. The drive arrangement according to claim 10, wherein the mounting arm includes a recess for mounting piping for channeling the second fluid from the rotatable interface to the brake caliper and/or wherein piping for channeling the second fluid from the rotatable interface to the brake caliper are substantially static with respect to the mounting arm while piping for channeling the second fluid from the vehicle to the rotatable interface are substantially static with respect to the vehicle.

12. The drive arrangement according to claim 1 further comprising a first sensor arranged to determine the rotational position of the rotatable interface with respect to the vehicle.

13. The drive arrangement according to claim 1, further comprising a first element mounted to the rotatable interface to allow the first element to rotate with the rotatable interface, wherein the first element includes a first electrical contact that is electrically coupled to a second electrical contact.

14. The drive arrangement according claim 13, further comprising a circumferential electrical conductive element mounted on the rotatable interface such that the annular electrical conductive element is in electrical contact with the first electrical contact.

15. The drive arrangement according to claim 14, further comprising a second element having a third electrical contact that is arranged to be in electrical contact with the circumferential electrical conductive element, wherein the rotational orientation of the second element is fixed with respect to the vehicle.

16. The drive arrangement according to claim 14, wherein the third electrical contact is electrically coupled to a vehicle power source and the second electrical contact is electrically coupled to the first electric motor to allow the first electric motor to be provided with a voltage from the vehicle power source via the circumferential electrical conductive element.

17. The drive arrangement according to claim 1, further comprising fluid means for allowing fluid to be transported between the vehicle and the mounting arm.

18. A drive arrangement for a vehicle, the drive arrangement comprising:
  a rotatable interface arranged to be mounted to the vehicle, wherein the rotatable interface is rotatably coupled to a mounting arm to allow continuous rotation of the mounting arm in a clockwise and anti clockwise direction that is substantially perpendicular to the longitudinal and transverse axis of the vehicle; and
  a first electric motor having a stator and a rotor, wherein the stator is coupled to the mounting arm to allow the axis of the rotor to be substantially perpendicular to the rotational axis of the rotatable interface, wherein the rotor is arranged to be coupled to a wheel of the vehicle to allow the electric motor to provide drive torque to the wheel;
  wherein the rotatable interface includes a third fluid interface for providing air from the vehicle for the suspension spring damper.

19. The drive arrangement according to claim 18, wherein the mounting arm includes a recess for mounting piping for channeling the third fluid from the rotatable interface to the suspension spring damper an/or wherein piping for channeling the third fluid from the rotatable interface to the suspension spring damper are substantially static with respect to the mounting arm while piping for channeling the third fluid from the vehicle to the rotatable interface are substantially static with respect to the vehicle.

20. A drive arrangement for a vehicle, the drive arrangement comprising:
  a rotatable interface arranged to be mounted to the vehicle, wherein the rotatable interface is rotatably coupled to a mounting arm to allow continuous rotation of the mounting arm in a clockwise and anti clockwise direction that is substantially perpendicular to the longitudinal and transverse axis of the vehicle;
  a first electric motor having a stator and a rotor, wherein the stator is coupled to the mounting arm to allow the axis of the rotor to be substantially perpendicular to the rotational axis of the rotatable interface, wherein the rotor is arranged to be coupled to a wheel of the vehicle to allow the electric motor to provide drive torque to the wheel;
  a first element mounted to the rotatable interface to allow the first element to rotate with the rotatable interface, wherein the first element includes a first electrical contact that is electrically coupled to a second electrical contact; and
  a circumferential electrical conductive element mounted on the rotatable interface such that the annular electrical conductive element is in electrical contact with the first electrical contact;
  wherein the annular electrical conductive element incorporates electrical conductive fluid.

21. A drive arrangement for a vehicle, the drive arrangement comprising:
  a rotatable interface arranged to be mounted to the vehicle, wherein the rotatable interface is rotatably coupled to a mounting arm to allow continuous rotation of the mounting arm in a clockwise and anti clockwise direction that is substantially perpendicular to the longitudinal and transverse axis of the vehicle; and
  a first electric motor having a stator and a rotor, wherein the stator is coupled to the mounting arm to allow the axis of the rotor to be substantially perpendicular to the rotational axis of the rotatable interface, wherein the rotor is arranged to be coupled to a wheel of the vehicle to allow the electric motor to provide drive torque to the wheel;
  wherein the fluid means includes a first fluid element and a second fluid element, wherein the rotational orientation of the first fluid element is fixed with respect to the vehicle and the rotational orientation of the second fluid element is fixed with respect to the rotatable interface.

22. The drive arrangement according to claim 21, wherein the first fluid element is arranged to have an inlet portion and an outlet portion, wherein the outlet portion of the first fluid element is arranged to extend along the rotational axis of the rotatable interface, and wherein the second fluid element is arranged to be mounted over the outlet portion of the first fluid element.

23. The drive arrangement according to claim 22, further comprising a seal formed between the first fluid element and the second fluid element to form an annular fluid channel around a fluid outlet formed in the outlet portion of the first fluid element and fluid inlet formed in the second fluid element to fluid to travel from the fluid outlet of the first fluid element and the fluid inlet of the second fluid element.

24. The drive arrangement according to claim 23, wherein the second fluid element includes a fluid outlet.

25. The drive arrangement according to claim 21, wherein the first fluid element includes a fluid conduit arranged to extend along the rotational axis of the rotatable interface having a first rotatable fluid coupling attached to one end of the fluid conduit and a second rotatable fluid coupling attached to the other end of the fluid conduit.

* * * * *